US007392156B2

(12) United States Patent
Weber

(10) Patent No.: US 7,392,156 B2
(45) Date of Patent: Jun. 24, 2008

(54) METHOD AND SYSTEM FOR DETERMINING HISTOGRAMS

(76) Inventor: James S. Weber, P.O. Box 603, Gurnee, IL (US) 60031-0603

( * ) Notice: Subject to any disclaimer, the term of this patent is extended or adjusted under 35 U.S.C. 154(b) by 0 days.

(21) Appl. No.: 11/047,018

(22) Filed: Jan. 30, 2005

(65) Prior Publication Data

US 2005/0190949 A1 Sep. 1, 2005

Related U.S. Application Data

(60) Provisional application No. 60/540,407, filed on Jan. 30, 2004.

(51) Int. Cl.
*G06F 17/18* (2006.01)
(52) U.S. Cl. ............... 702/180; 702/189; 382/168
(58) Field of Classification Search ............ 702/67, 702/68, 179–181, 189; 382/168–172
See application file for complete search history.

(56) References Cited

U.S. PATENT DOCUMENTS

| 5,189,727 | A | 2/1993 | Guerreri | 704/231 |
|---|---|---|---|---|
| 5,367,337 | A | 11/1994 | Pyle | 348/521 |
| 5,930,001 | A | 7/1999 | Satoh | 358/296 |
| 5,956,433 | A | 9/1999 | Sasaki | 382/275 |
| 6,088,478 | A | 7/2000 | Davies | 382/168 |
| 6,741,885 | B1 | 5/2004 | Park | 600/509 |
| 6,810,145 | B2 | 10/2004 | Briand | 382/170 |
| 6,938,824 | B2 | 9/2005 | Madej | 235/462.16 |
| 2001/0036313 | A1 | 11/2001 | Briand | 382/170 |
| 2003/0169921 | A1 | 9/2003 | Yamamoto | 382/170 |
| 2005/0089223 | A1 | 4/2005 | Krumm | 382/170 |
| 2005/0104827 | A1 | 5/2005 | Baik | 345/87 |

OTHER PUBLICATIONS

Weber, James S., PhD, "Looking At Histograms and Histogram Appearances," University of Illinois at Chicago, Mar. 12, 2006, 23 pp.

*Primary Examiner*—Manuel L Barbee
(74) *Attorney, Agent, or Firm*—Lesavich High-Tech Law Group, P.C.; Stephen Lesavich

(57) ABSTRACT

Histograms are widely used to explore data, to present data, and to persuade with data. A method and system for identifying all possible histograms from a data sample using histogram appearances. The method and system includes determining all possible one dimensional histogram appearances for a transformed data sample using constant width intervals and for multidimensional appearances with data cell boundaries that are parallel as well as not parallel to data space axes together with multiple conditions on the interval widths for each dimension or transformed dimension.

32 Claims, 12 Drawing Sheets

(δ₁ AND δ₂ NOT DRAWN TO SCALE)

| | | | | | | | | | | |
|---|---|---|---|---|---|---|---|---|---|---|
| 243 | -0.2793 | 8.0362 | S | 20 | | 115 | 2.2056 | 2.0690 | | 10 7 3 |
| 192 | -0.2793 | 7.6389 | Rev | 19 | 1 | 22 | 2.3361 | 1.8810 | | 10 6 4 |
| 157 | -0.2793 | 7.0598 | Rev | 18 | 2 | 184 | 0.8418 | 3.2589 | | 9 10 1 |
| 125 | -0.2793 | 6.6238 | Rev | 17 | 3 | 149 | 1.4209 | 2.6798 | | 9 9 2 |
| 98 | -0.2793 | 6.2268 | Rev | 16 | 4 | 117 | 1.8569 | 2.2438 | | 9 8 3 |
| 79 | -0.2793 | 5.9277 | Rev | 15 | 5 | 223 | 2.2076 | 1.9041 | | 9 7 4 |
| 231 | 0.2485 | 4.9909 | Rev | 14 | 6 | 183 | 0.6359 | 3.3619 | | 8 11 1 |
| 230 | -0.3138 | 5.3220 | Rev | 13 | 7 | 148 | 1.2150 | 2.7827 | | 8 10 2 |
| 229 | -0.3387 | 5.3220 | Rev | 12 | 8 | 116 | 1.6510 | 2.3467 | | 8 9 3 |
| 232 | -0.6508 | 5.3220 | Rev | 11 | 9 | 222 | 1.9983 | 1.9994 | | 8 8 4 |
| 233 | -1.0444 | 5.3220 | S | 10 | 10 | 185 | 0.5242 | 3.4177 | | 7 12 1 |
| 235 | -1.2213 | 5.3220 | Rev | 9 | 11 | 150 | 1.1033 | 2.8386 | | 7 11 2 |
| 234 | -1.3242 | 5.3220 | Rev | 8 | 12 | 118 | 1.5393 | 2.4026 | | 7 10 3 |
| 236 | -1.3801 | 5.3220 | Rev | 7 | 13 | 224 | 1.9006 | 2.0413 | | 7 9 4 |
| 237 | -1.7215 | 5.3220 | Rev | 6 | 14 | 186 | -0.1587 | 3.7592 | Rev | 6 13 1 |
| 238 | -2.0806 | 5.3220 | Rev | 5 | 15 | 151 | 0.4204 | 3.1800 | Rev | 6 12 2 |
| 239 | -2.2412 | 5.3220 | Rev | 4 | 16 | 119 | 0.8564 | 2.7440 | Rev | 6 11 3 |
| 240 | -2.4061 | 5.3220 | Rev | 3 | 17 | 225 | 1.3625 | 2.2777 | Rev | 6 10 4 |
| 242 | -2.5091 | 5.3220 | Rev | 2 | 18 | 221 | 1.2502 | 2.1991 | Rev | 6 9 5 |
| 241 | -2.6758 | 5.3220 | Rev | 1 | 19 | 228 | 1.1336 | 2.1991 | S | 6 8 6 |
| 61 | 2.3743 | 2.6610 | | 14 | 5 1 | 187 | -0.8768 | 4.1182 | Rev | 5 14 1 |
| 50 | 2.3472 | 2.6610 | | 13 | 6 1 | 152 | -0.2976 | 3.5391 | Rev | 5 13 2 |
| 39 | 2.3223 | 2.6610 | | 12 | 7 1 | 120 | 0.1384 | 3.1031 | Rev | 5 12 3 |
| 181 | 1.9494 | 2.7273 | | 11 | 8 1 | 93 | 0.5354 | 2.7061 | Rev | 5 11 4 |
| 146 | 2.1614 | 2.309 | | 6 11 | 7 2 | 74 | 0.8345 | 2.4070 | S | 5 10 5 |
| 28 | 2.3132 | 2.081 | | 9 11 | 6 3 | 226 | 0.9739 | 2.2675 | Rev | 5 9 6 |
| 182 | 1.1955 | 3.0821 | | 10 | 9 1 | 188 | -1.1981 | 4.2789 | Rev | 4 15 1 |
| 147 | 1.7746 | 2.5030 | | 10 | 8 2 | 153 | -0.6189 | 3.6997 | Rev | 4 14 2 |
| | | | | | | 121 | -0.1829 | 3.2637 | Rev | 4 13 3 |
| | | | | | | 94 | 0.2141 | 2.8667 | S | 4 12 4 |
| | | | | | | 75 | 0.5132 | 2.5676 | Rev | 4 11 5 |
| | | | | | | 227 | 0.6928 | 2.3880 | Rev | 4 10 6 |
| | | | | | | 189 | -1.5279 | 4.4438 | Rev | 3 16 1 |
| | | | | | | 154 | -0.9488 | 3.8647 | Rev | 3 15 2 |
| | | | | | | 122 | -0.5128 | 3.4287 | S | 3 14 3 |
| | | | | | | 95 | -0.1158 | 3.0317 | Rev | 3 13 4 |
| | | | | | | 76 | 0.1833 | 2.7326 | Rev | 3 12 5 |
| | | | | | | 218 | 0.4041 | 2.5117 | Rev | 3 11 6 |
| | | | | | | 191 | -1.7338 | 4.5467 | Rev | 2 17 1 |
| | | | | | | 156 | -1.1546 | 3.9676 | S | 2 16 2 |

FIG. 6B

| 56 | | | | | | 58 | | | | | |
|---|---|---|---|---|---|---|---|---|---|---|---|
| 124 | -0.7186 | 3.5316 | Rev | 2 | 15 | 3 | 145 | 1.2642 | 1.8166 | 4 7 7 2 |
| 97 | -0.3216 | 3.1346 | Rev | 2 | 14 | 4 | 217 | 1.4467 | 1.6226 | 4 7 6 3 |
| 78 | -0.0225 | 2.8354 | Rev | 2 | 13 | 5 | 214 | 1.4263 | 1.5710 | 4 7 5 4 |
| 220 | 0.2240 | 2.5889 | Rev | 2 | 12 | 6 | 58 | 0.6610 | 2.2548 | 3 11 5 1 |
| 190 | -2.1996 | 4.7796 | S | 1 | 18 | 1 | 174 | 0.8405 | 2.0831 | 3 10 6 1 |
| 155 | -1.6204 | 4.2005 | Rev | 1 | 17 | 2 | 47 | 0.9585 | 2.0157 | 3 10 5 2 |
| 123 | -1.1844 | 3.7645 | Rev | 1 | 16 | 3 | 172 | 0.8152 | 2.0841 | 3 9 7 1 |
| 96 | -0.7874 | 3.3675 | Rev | 1 | 15 | 4 | 36 | 0.9519 | 2.0157 | 3 9 6 2 |
| 77 | -0.4883 | 3.0684 | Rev | 1 | 14 | 5 | 180 | 0.7969 | 2.0841 | 3 8 8 1 |
| 219 | -0.1835 | 2.7636 | Rev | 1 | 13 | 6 | 142 | 0.9732 | 1.9490 | 3 8 7 2 |
| 90 | 2.2963 | 1.7629 | | 9 | 7 | 3 1 | 111 | 1.2015 | 1.7143 | 3 8 6 3 |
| 17 | 2.3421 | 1.6849 | | 9 | 6 | 4 1 | 212 | 1.3109 | 1.6049 | 3 8 5 4 |
| 89 | 2.1944 | 1.8033 | | 8 | 8 | 3 1 | 60 | 0.4809 | 2.3320 | 2 12 5 1 |
| 13 | 2.3129 | 1.6849 | | 8 | 7 | 4 1 | 49 | 0.6177 | 2.1953 | 2 11 6 1 |
| 91 | 2.0967 | 1.8452 | | 7 | 9 | 3 1 | 38 | 0.6426 | 2.1703 | 2 10 7 1 |
| 72 | 2.2547 | 1.6915 | | 7 | 8 | 4 1 | 179 | 0.6779 | 2.1350 | 2 9 8 1 |
| 171 | 2.3360 | 1.5841 | | 7 | 7 | 5 1 | 141 | 0.8292 | 1.9838 | 2 9 7 2 |
| 9 | 2.3662 | 1.5395 | | 7 | 7 | 4 2 | 109 | 1.0472 | 1.7658 | 2 9 6 3 |
| 92 | 1.9592 | 1.9041 | | 6 | 10 | 3 1 | 207 | 1.1652 | 1.6478 | 2 9 5 4 |
| 73 | 1.8401 | 1.9041 | | 6 | 9 | 4 1 | 59 | 0.0734 | 2.5067 | 1 13 5 1 |
| 177 | 1.6733 | 1.8845 | | 6 | 8 | 5 1 | 48 | 0.1518 | 2.4282 | 1 12 6 1 |
| 139 | 2.0221 | 1.5928 | | 6 | 8 | 4 2 | 37 | 0.1768 | 2.4033 | 1 11 7 1 |
| 210 | 2.2817 | 1.3921 | | 6 | 8 | 3 3 | 178 | 0.2703 | 2.3097 | 1 10 8 1 |
| 138 | 1.7684 | 1.6199 | | 6 | 7 | 5 2 | 140 | 0.4798 | 2.1002 | 1 10 7 2 |
| 209 | 2.1234 | 1.4424 | | 6 | 7 | 4 3 | 108 | 0.6977 | 1.8820 | 1 10 6 3 |
| 137 | 1.7434 | 1.6199 | | 6 | 6 | 6 2 | 206 | 1.0114 | 1.6947 | 1 10 5 4 |
| 208 | 2.0610 | 1.4611 | | 6 | 6 | 5 3 | 110 | 0.5662 | 1.8810 | 1 9 7 3 |
| 143 | 1.7231 | 1.6199 | | 6 | 5 | 7 2 | 211 | 0.7136 | 1.7805 | 1 9 6 4 |
| 215 | 1.9097 | 1.5027 | | 6 | 5 | 6 3 | 213 | 0.6206 | 1.7804 | 1 8 7 4 |
| 175 | 1.1823 | 2.0591 | | 5 | 9 | 5 1 | 55 | 2.3743 | 1.3305 | 6 8 3 2 1 |
| 56 | 1.4028 | 1.8386 | | 5 | 9 | 4 2 | 44 | 2.3472 | 1.3305 | 6 7 4 2 1 |
| 45 | 1.4746 | 1.7668 | | 5 | 8 | 5 2 | 33 | 2.3223 | 1.3305 | 6 6 5 2 1 |
| 34 | 1.4996 | 1.7419 | | 5 | 7 | 6 2 | 112 | 2.1498 | 1.3600 | 6 5 6 2 1 |
| 144 | 1.5453 | 1.6961 | | 5 | 6 | 7 2 | 166 | 2.1797 | 1.2670 | 6 5 5 3 1 |
| 216 | 1.6718 | 1.5697 | | 5 | 6 | 6 3 | 83 | 2.2287 | 1.1853 | 6 5 5 2 2 |
| 176 | 0.9595 | 2.1147 | | 4 | 10 | 5 1 | 200 | 2.2679 | 1.1219 | 6 5 4 3 2 |
| 57 | 1.2150 | 1.9191 | | 4 | 10 | 4 2 | 203 | 2.2332 | 1.0995 | 6 5 3 4 2 |
| 173 | 0.9896 | 2.0157 | | 4 | 9 | 6 1 | 113 | 1.7722 | 1.4692 | 5 6 6 2 1 |
| 46 | 1.1417 | 1.9324 | | 4 | 9 | 5 2 | 167 | 1.8998 | 1.3380 | 5 6 5 3 1 |
| 35 | 1.1783 | 1.9025 | | 4 | 8 | 6 2 | 87 | 2.0367 | 1.2413 | 5 6 5 2 2 |

FIG. 6C

| 60 | | | | | | | | | 62 | | | | | | | |
|---|---|---|---|---|---|---|---|---|---|---|---|---|---|---|---|---|
| 164 | 1.9157 | 1.2769 | 5 | 6 | 4 | 4 | 1 | | 195 | 1.5203 | 1.2471 | 1 | 8 | 5 | 3 | 3 |
| 69 | 2.0237 | 1.2141 | 5 | 6 | 4 | 3 | 2 | | 63 | 0.8340 | 1.5819 | 1 | 7 | 7 | 4 | 1 |
| 205 | 2.1022 | 1.1402 | 5 | 6 | 3 | 4 | 2 | | 168 | 0.9412 | 1.5283 | 1 | 7 | 6 | 5 | 1 |
| 202 | 2.0573 | 1.1431 | 5 | 5 | 4 | 4 | 2 | | 129 | 1.2150 | 1.3914 | 1 | 7 | 6 | 4 | 2 |
| 114 | 1.6087 | 1.5173 | 4 | 7 | 6 | 2 | 1 | | 194 | 1.4886 | 1.2546 | 1 | 7 | 6 | 3 | 3 |
| 88 | 1.6119 | 1.4574 | 4 | 7 | 5 | 3 | 1 | | 71 | 0.8164 | 1.5819 | 1 | 6 | 8 | 4 | 1 |
| 165 | 1.7405 | 1.3308 | 4 | 7 | 4 | 4 | 1 | | 170 | 0.8681 | 1.5493 | 1 | 6 | 7 | 5 | 1 |
| 70 | 1.8973 | 1.2438 | 4 | 7 | 4 | 3 | 2 | | 134 | 1.0686 | 1.4351 | 1 | 6 | 7 | 4 | 2 |
| 24 | 1.9930 | 1.1840 | 4 | 7 | 3 | 4 | 2 | | 198 | 1.3862 | 1.2778 | 1 | 6 | 7 | 3 | 3 |
| 161 | 1.6513 | 1.3493 | 4 | 6 | 5 | 4 | 1 | | 135 | 1.0357 | 1.4089 | 1 | 5 | 8 | 4 | 2 |
| 66 | 1.7604 | 1.2841 | 4 | 6 | 5 | 3 | 2 | | 199 | 1.1617 | 1.3282 | 1 | 5 | 8 | 3 | 3 |
| 204 | 1.8949 | 1.1892 | 4 | 6 | 4 | 4 | 2 | | 62 | 2.3473 | 1.0693 | 6 | 5 | 4 | 3 | 1 | 1 |
| 197 | 1.8700 | 1.1679 | 4 | 6 | 4 | 3 | 3 | | 128 | 2.2759 | 1.0775 | 6 | 5 | 3 | 4 | 1 | 1 |
| 126 | 1.8048 | 1.1909 | 4 | 5 | 5 | 4 | 2 | | 6 | 2.2515 | 1.0696 | 6 | 5 | 3 | 3 | 2 | 1 |
| 193 | 1.8248 | 1.1781 | 4 | 5 | 5 | 3 | 3 | | 133 | 2.1850 | 1.0965 | 5 | 6 | 3 | 4 | 1 | 1 |
| 82 | 1.4308 | 1.4959 | 3 | 8 | 5 | 3 | 1 | | 23 | 2.2187 | 1.0753 | 5 | 6 | 3 | 3 | 2 | 1 |
| 25 | 1.5959 | 1.3836 | 3 | 8 | 4 | 4 | 1 | | 127 | 2.1022 | 1.1152 | 5 | 5 | 4 | 4 | 1 | 1 |
| 85 | 1.4364 | 1.4520 | 3 | 7 | 6 | 3 | 1 | | 5 | 2.1440 | 1.0859 | 5 | 5 | 4 | 3 | 2 | 1 |
| 162 | 1.5363 | 1.3905 | 3 | 7 | 5 | 4 | 1 | | 132 | 2.0043 | 1.1375 | 4 | 6 | 4 | 4 | 1 | 1 |
| 67 | 1.5752 | 1.3407 | 3 | 7 | 5 | 3 | 2 | | 18 | 2.0000 | 1.1159 | 4 | 6 | 4 | 3 | 2 | 1 |
| 19 | 1.6192 | 1.2966 | 3 | 7 | 4 | 4 | 2 | | 4 | 1.9111 | 1.1196 | 4 | 5 | 5 | 3 | 2 | 1 |
| 136 | 1.6717 | 1.2442 | 3 | 6 | 5 | 4 | 2 | | 101 | 1.8003 | 1.1251 | 3 | 6 | 5 | 3 | 2 | 1 |
| 201 | 1.7124 | 1.2034 | 3 | 6 | 5 | 3 | 3 | | 14 | 1.8783 | 1.0657 | 3 | 6 | 5 | 2 | 3 | 1 |
| 27 | 1.2239 | 1.5890 | 2 | 9 | 5 | 3 | 1 | | 100 | 1.7746 | 1.1116 | 3 | 5 | 6 | 3 | 2 | 1 |
| 86 | 1.3044 | 1.5085 | 2 | 8 | 6 | 3 | 1 | | 10 | 1.8604 | 1.0687 | 3 | 5 | 6 | 2 | 3 | 1 |
| 163 | 1.3762 | 1.4309 | 2 | 8 | 5 | 4 | 1 | | 105 | 1.7629 | 1.1057 | 3 | 4 | 7 | 3 | 2 | 1 |
| 68 | 1.4554 | 1.3750 | 2 | 8 | 5 | 3 | 2 | | 53 | 1.8071 | 1.0794 | 3 | 4 | 7 | 2 | 3 | 1 |
| 21 | 1.4971 | 1.3489 | 2 | 8 | 4 | 4 | 2 | | 42 | 1.7911 | 1.0724 | 3 | 4 | 6 | 3 | 3 | 1 |
| 160 | 1.3672 | 1.4130 | 2 | 7 | 6 | 4 | 1 | | 31 | 1.7849 | 1.0661 | 3 | 4 | 5 | 4 | 3 | 1 |
| 65 | 1.4065 | 1.3894 | 2 | 7 | 6 | 3 | 2 | | 3 | 1.7840 | 1.0653 | 3 | 4 | 4 | 5 | 3 | 1 |
| 131 | 1.5051 | 1.3139 | 2 | 7 | 5 | 4 | 2 | | 16 | 1.6045 | 1.2084 | 2 | 7 | 5 | 3 | 2 | 1 |
| 196 | 1.5795 | 1.2334 | 2 | 7 | 5 | 3 | 3 | | 12 | 1.6281 | 1.1848 | 2 | 6 | 6 | 3 | 2 | 1 |
| 26 | 1.1168 | 1.6319 | 1 | 10 | 5 | 3 | 1 | | 106 | 1.6742 | 1.1376 | 2 | 5 | 7 | 3 | 2 | 1 |
| 81 | 1.0542 | 1.6104 | 1 | 9 | 6 | 3 | 1 | | 54 | 1.7333 | 1.1009 | 2 | 5 | 7 | 2 | 3 | 1 |
| 20 | 1.2448 | 1.4865 | 1 | 9 | 5 | 4 | 1 | | 104 | 1.6680 | 1.1201 | 2 | 5 | 6 | 4 | 2 | 1 |
| 84 | 0.7674 | 1.6927 | 1 | 8 | 7 | 3 | 1 | | 43 | 1.7107 | 1.1002 | 2 | 5 | 6 | 3 | 3 | 1 |
| 159 | 1.0467 | 1.5292 | 1 | 8 | 6 | 4 | 1 | | 32 | 1.7496 | 1.0779 | 2 | 5 | 5 | 4 | 3 | 1 |
| 64 | 1.2986 | 1.4220 | 1 | 8 | 6 | 3 | 2 | | 8 | 1.7632 | 1.0705 | 2 | 5 | 4 | 5 | 3 | 1 |
| 169 | 1.0213 | 1.5043 | 1 | 8 | 5 | 5 | 1 | | 41 | 1.6843 | 1.1032 | 2 | 4 | 7 | 3 | 3 | 1 |
| 130 | 1.3040 | 1.3766 | 1 | 8 | 5 | 4 | 2 | | 30 | 1.6978 | 1.0952 | 2 | 4 | 6 | 4 | 3 | 1 |

| | | | | | | | |
|---|---|---|---|---|---|---|---|
| 2 | 1.7200 | 1.0792 | 2 | 4 | 5 | 5 | 3 | 1 |
| 15 | 1.5465 | 1.2307 | 1 | 8 | 5 | 3 | 2 | 1 |
| 11 | 1.5431 | 1.2273 | 1 | 7 | 6 | 3 | 2 | 1 |
| 51 | 1.5423 | 1.1961 | 1 | 6 | 7 | 3 | 2 | 1 |
| 99 | 1.6447 | 1.1272 | 1 | 6 | 6 | 4 | 2 | 1 |
| 7 | 1.6551 | 1.1209 | 1 | 6 | 6 | 3 | 3 | 1 |
| 52 | 1.2719 | 1.2653 | 1 | 5 | 8 | 3 | 2 | 1 |
| 103 | 1.3832 | 1.2091 | 1 | 5 | 7 | 4 | 2 | 1 |
| 40 | 1.6231 | 1.1258 | 1 | 5 | 7 | 3 | 3 | 1 |
| 102 | 1.2916 | 1.2306 | 1 | 5 | 6 | 5 | 2 | 1 |
| 29 | 1.5892 | 1.1314 | 1 | 5 | 6 | 4 | 3 | 1 |
| 107 | 1.2351 | 1.2386 | 1 | 5 | 5 | 6 | 2 | 1 |
| 158 | 1.4886 | 1.1341 | 1 | 5 | 5 | 5 | 3 | 1 |
| 80 | 1.4173 | 1.1026 | 1 | 5 | 5 | 5 | 2 | 2 |
| 1 | 1.3565 | 1.0840 | 1 | 5 | 5 | 4 | 3 | 2 |

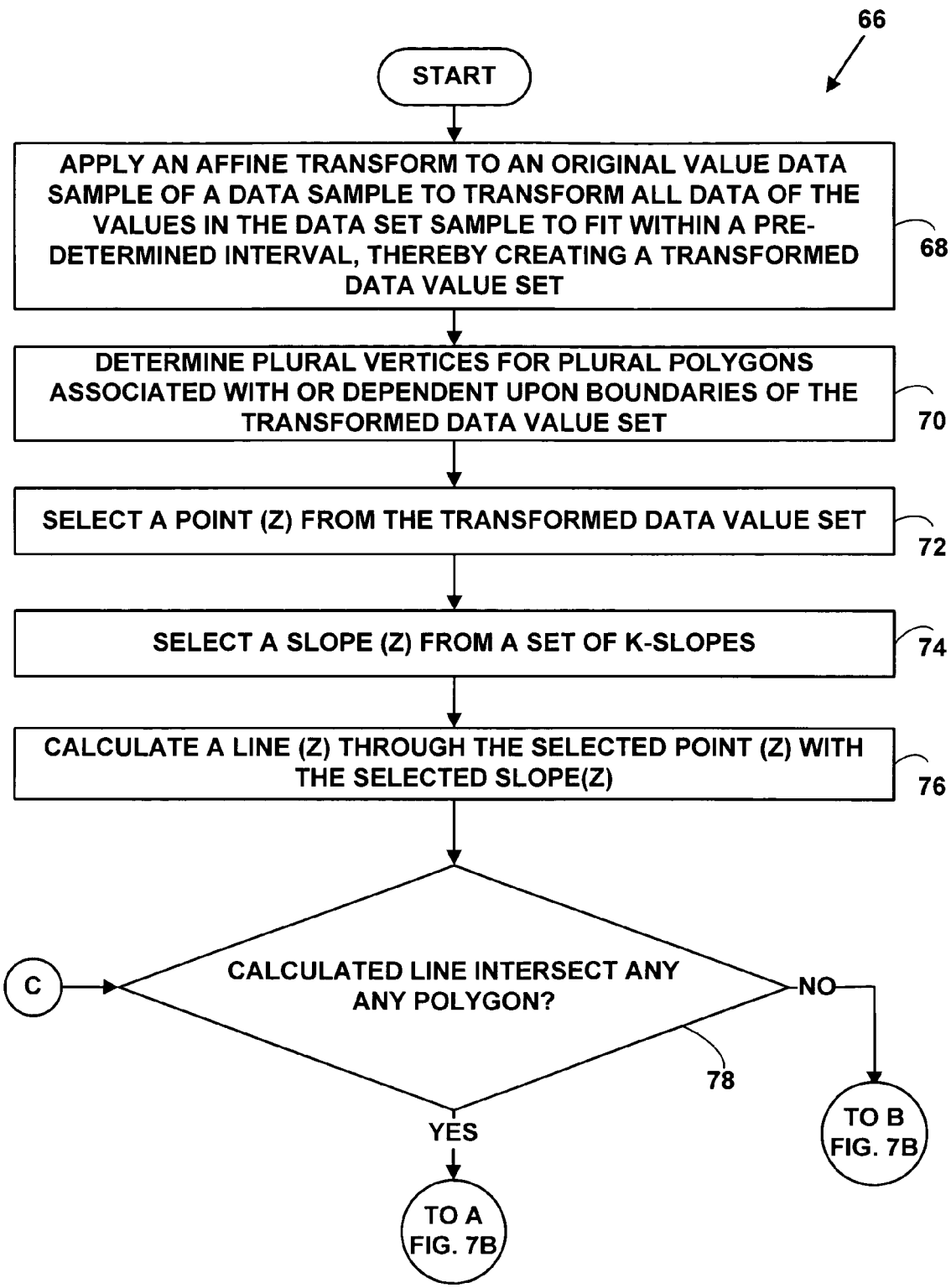

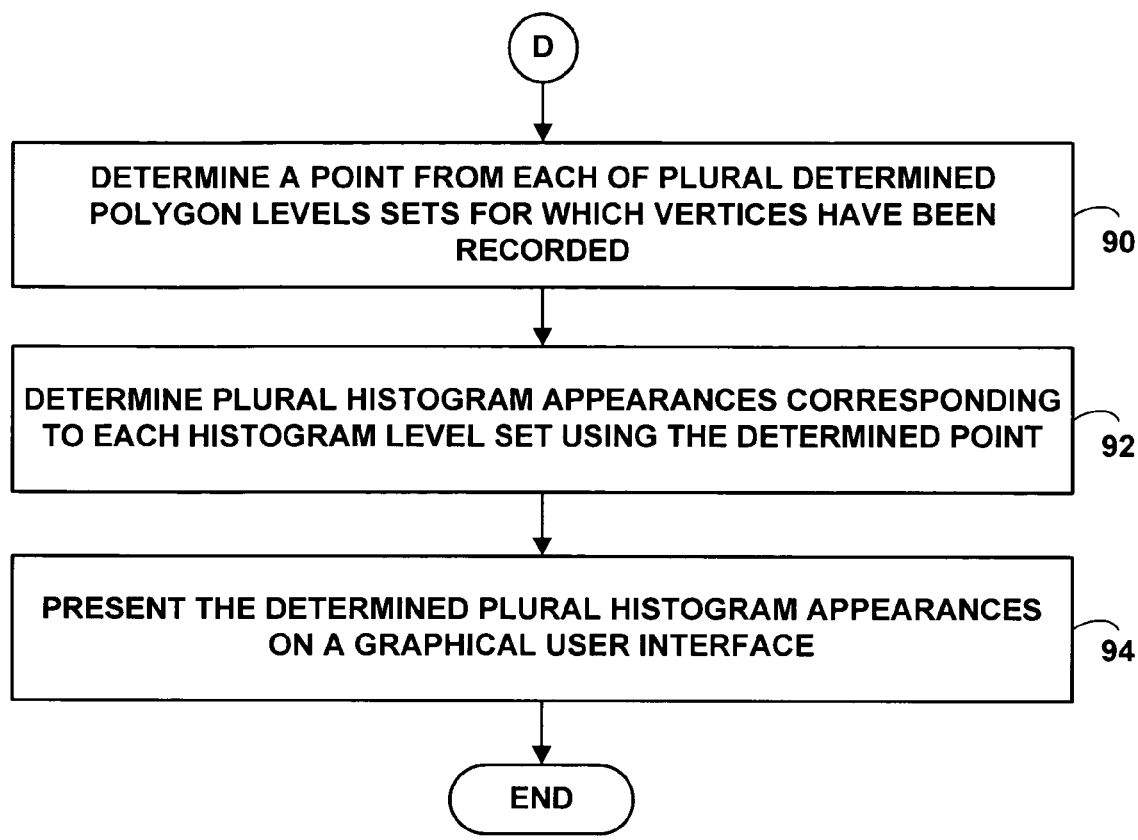

METHOD AND SYSTEM FOR DETERMINING HISTOGRAMS

CROSS REFERENCES TO RELATED APPLICATIONS

This application claims priority to U.S. Provisional Application 60/540,407, filed on Jan. 30, 2004, the contents of which are incorporated by reference.

FIELD OF THE INVENTION

This invention relates analysis of data. More specifically, it relates to a method and system for creating, analyzing and selecting histograms having a preferred appearance and/or other feature(s).

BACKGROUND OF THE INVENTION

A histogram is a graphical chart, such as a bar chart, representing a frequency distribution of data elements where the heights of objects in the chart represent observed frequencies of the data elements. There is often a great variability among the many possible histograms of a data sample that are produced.

Histograms have been in use for approximately 300 years and perhaps were the first and now are the most widely used graphic for quantitative data. The histogram is the most common graph of the distribution of one quantitative variable. Every year millions of individuals look at and may be influenced by histograms.

However, just as a data sample does not necessarily represent a population, a histogram does not necessarily represent a data sample. The appearance of a histogram in a data sample can be misleading. To make informed use of histograms for a presentation, an analysis or a decision, a choice among many possible histograms is required.

When a histogram appearance is used, if it matters, experts may consider all of the others, with certain knowledge that the palate has of all the possibilities. Selection and optimality criteria may be applied to the finite set of possible appearances. A clearer understanding is obtained than from simply allowing location and width to vary continuously or haphazardly or according to a procedure unrelated to location and width level sets for the different appearances. It may be of interest to consider issues of human cognition in the context of data grouped with uniformly wide intervals. In practice, it is, of course, impossible to continuously vary any parameter.

For most samples of data with n-data elements, many histograms are possible and many are not. One problem is to determine well defined subsets of all histogram appearances that are possible for a given data sample and to display those histogram appearances and a typical or preferred histogram having an appearance.

Thus, it is desirable to determine all possible histograms that an n-element data sample may have. These histograms should include appearances and level sets, as well as families of consistent histogram appearances which might be important in making the best use of histograms.

SUMMARY OF THE INVENTION

In accordance with preferred embodiments of the present invention, some of the problems associated with creating and selecting histogram appearances, and histograms from data samples are overcome. A method and system for determining histograms is presented.

The method and system includes creating all possible one dimensional histogram appearances and histogram level sets for a transformed data sample using constant width intervals and creating all multidimensional histogram appearances and histogram level sets for a transformed data sample with data cell boundaries that are parallel as well as not parallel to data space axes.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 6A-6D are a block diagram illustrating an exemplary set of histogram appearances; and FIGS. 7A, 7B and 7C are a flow diagram illustrating a method for determining all possible histogram appearances from a data sample.

DETAIL DESCRIPTION OF THE INVENTION

Exemplary Histogram Computing System

Figure 1:
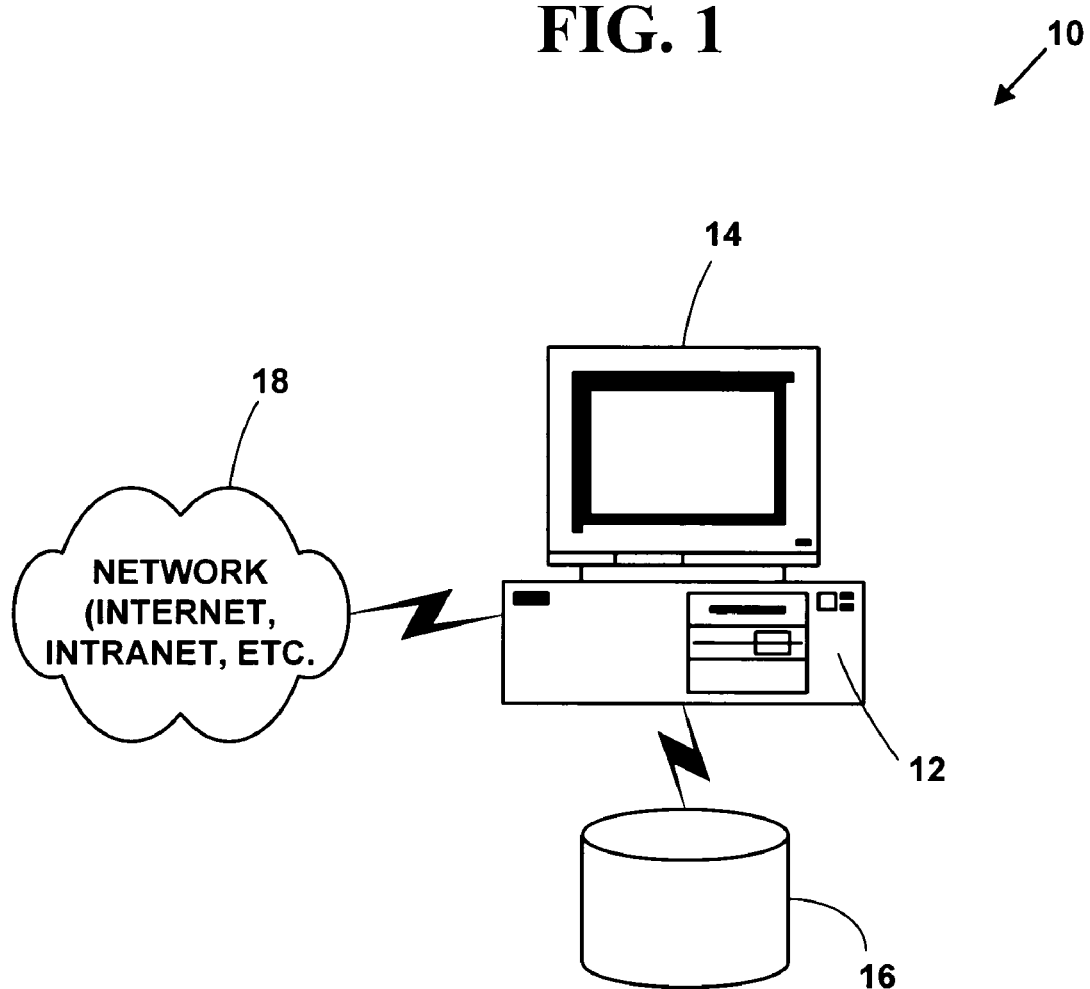
FIG. 1 illustrates a histogram computing system.

FIG. 1 illustrates a histogram computing system 10 for embodiments of the present invention. The histogram computing system 10 includes one or more computers 12 with computer displays 14 for graphically displaying histograms (only one is illustrated). The computer display presents a windowed graphical user interface (GUI) with multiple windows to a user. The computer 12 is associated with one or more databases 16 (one of which is illustrated) used to store data for the histogram computing system 10. The one or more databases 16 include a memory system within the computer 12 or secondary storage associated with computer 12 such as a hard disk, floppy disk, optical disk, or other non-volatile mass storage devices. The one or more computers 12 may be replaced with client terminals in communications with one or more servers, a personal digital/data assistant (PDA), a laptop computer, a mobile computer, an Internet appliance, one or two-way pagers, mobile phones, or other similar mobile, non-mobile, desktop or hand-held electronic devices.

The one or more computers 12 are also in communications with a communications network 18 (e.g., the Internet, intranet, Public Switch Telephone Network (PSTN), Local Area Network, (LAN), Wide Area Network (WAN), etc.). The communications includes, but is not limited to, communications over a wire connected to the one or more computers 12, wireless communications, and other types of communications using one or more communications and/or networking protocols.

The communications network 18 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

Preferred embodiments of the present invention includes network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, ADSL Forum or other standards bodies or forums. However, network devices and interfaces based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

The one or more computers 12 include a protocol stack with multiple layers based on the Internet Protocol or Opens Systems Interconnection (OSI) reference model.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building—and relying—upon the standards included in the levels below it. The OSI reference model includes from lowest-to-highest, a physical, data-link, network, transport, session, presentation and application layer. The lowest of the seven layers deals solely with hardware links; the highest deals with software interactions at the application-program level.

The communications network 18 includes, but is not limited to data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 28 and the present invention is not limited to TCP/UDP/IP.

An operating environment for histogram computing system 10 includes a processing system with at least one high speed Central Processing Unit ("CPU") or other processor. In accordance with the practices of persons skilled in the art of computer programming, the present invention is described below with reference to acts and symbolic representations of operations that are performed by the processing system, unless indicated otherwise. Such acts and operations are referred to as being "computer-executed," "CPU executed," or "processor executed."

It will be appreciated that the acts and symbolically represented operations include the manipulation of electrical signals by the CPU. The electrical system represents data bits that cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

Exemplary Histograms

A sample "S," $<x_i>$, i=1, ... n, of size n, is a collection of n selections, with replacement, from a population of possible quantitative observations or numbers. A number of distinct values in S is denoted by $n^* \leq n$ and a value set is denoted by "$S^*$." $S^*$ determines a level set of location "e" and width "w" combinations and S determines actual appearances (i.e., repeated sample values do not change the level sets, only the appearances. A "level set" for a function is a set of points for which a function has a constant value or constant list of values. That is, in this context, "value" may be a list of values, that is, an appearance. It is understood that every integer of a list of integer frequencies remains unchanged for all of histograms corresponding to any (e, w) point within a same histogram appearance level set. Repeated values add only minor details to the study of appearance reversals. A sample or the value set, $x_i$, is in its rank order form, denoted "$x_{(i)}$," when $x_{(i)} \leq x_{(i+1)}$, i=1, 2, ... n for sample points or $x_{(i)} < x_{(i+1)}$, i=1, 2, ... n* for distinct values.

A "frequency histogram" is a graphic representing a frequency of sample points in equal width adjacent histogram intervals. In one embodiment, closed histogram intervals [a, b] are used. In another embodiment, half-open histogram intervals "[a, b)," are used so that there is no ambiguity regarding sample values that are the same as interval end points. That is, according to standard definition of the expression "[a,b)", well known in both the statistical arts and mathematical arts, a sample point "a" is included in the interval [a,b), whereas the point "b" is not included in the interval [a,b), but in the successor interval, [b, (b+(b−a))). Other notation reflecting this definition is that [a,b) is defined to be a set of values, x, such that b≦x<a. However, the present invention is not limited to such an embodiment or using half-open intervals or assigning a count of one point to only one interval. For example, some conventions assign one-half for a point that equals an interval end point to each of the intervals separated by such an end point value. Other kinds of intervals and conventions can also be used to practice the invention. Moreover, in one embodiment, an equality of a sample value or many sample values to an interval endpoint is precise. The appearance level sets are distinct for the equality or lack there of any sample value to any interval end point.

A "histogram appearance" or simply "appearance" of a histogram is a list, $a_k$, of counts of sample points corresponding to a list of histogram intervals, wherein first and last counts, $a_1$, $a_{last}$, are positive.

For any possible appearance and fixed sample, an appearance can be achieved with interval end points (e.g., [1, 2)) that do not equal any sample values, provided the exact end points can be chosen after the sample is taken. Half open intervals remove ambiguity if a data sample value equals an interval endpoint, in advance of selecting a sample. In one embodiment, frequencies, not relative frequencies are used. However, the present invention is not limited to frequencies and other types of frequencies, such as and especially relative frequencies can also be used to practice the invention.

A "histogram sequence" is a sequence, $h_k$, of counts of sample points corresponding to some sequence of histogram intervals. An index, k, ranges from $-\infty$ to $+\infty$ even though all but finitely many counts, $h_k$, are zero. That is, a histogram sequence, $h_k$, is like a histogram appearance, $a_k$, but is a sequence, not a finite list and does not have the restriction that $h_1$, is the first positive frequency.

Sequences of intervals and finite lists of intervals for histograms are denoted by $\{[e+(k-1)w, e+kw)|k=-\infty$ to $+\infty$, or k=1 to K$\}$. Changing a location parameter, "e," by a multiple of "w," a width parameter, leads to a different enumeration of a same set of intervals, a same partition of a real number line, a same graphic appearance, but a shifted histogram sequence. The enumeration intended for a histogram appearance is one wherein the k=1 corresponds to the first interval having one or more sample values. As is known in the mathematical notation for statistical arts, use of "[" and ")" is a common notation indicating half open intervals as used by M. G. Kendall and A. Stewart *The Advanced Theory of Statistics*, $3^{rd}$ ed., Vol. 1. London: Griffin Publishing (1969).

A positive "affine transformation" on a real line is a linear transformation followed by a translation in a form A(x)=Mx+v, wherein M>0. A "translation" is moving an origin or a coordinate system to another location while keeping directions of coordinate axis in a same direction. A positive affine transformation of a data sample has a same set of histogram sequences and appearances as an original data sample. That is, an affine transformation will not change an order of data values or relative separation of data values. Consequently a positive affine transformation does not change a count of sample points in each half open interval. A negative affine transformation of a data sample, in the form A(x)=Mx+v, wherein M<0, reverses the appearances. That is, if A(x) is a negative affine transformation of the data sample, the every appearance of the data sample will have a reversed appearance in the transformed data sample, if M<0.

For a given data sample, an existence of a prescribed appearance, $a_k$, is equivalent to an existence of e and w that satisfy a system of K inequalities as shown by Equation (1).

$$\{e+(k-1)w \leq \text{the corresponding } a_k \text{ values of } x_{(i)} < e+kw$$
$$\text{for } k=1 \text{ to } K, \text{ the index of the last positive count}$$
$$\text{of } a_k\} \quad (1)$$

In this description the term "Equation" is used for simplicity even though an Equation may include a series of Equations as is illustrated by Equation (1) or multiple equations that are not a system of equations. In Equation (1), K is a number of intervals between and including a first and a last having sample values within the intervals.

A sample, "S," has an appearance, $a_k$, if and only if a linear program defined by the K inequalities, in Equation (1) is feasible, wherein e and w are decision variables. An optimizing activity can be indicated such as maximizing or minimizing the interval width, w.

Placing a $x_{(i)}$ sample value in the $k^{th}$ interval is equivalent to satisfying an inequality illustrated in Equation (2).

$$e+(k-1)w \leq x_{(i)} < e+kw \quad (2)$$

The set, $\{(e, w)\}$, of possibilities for (e, w) can be described in an $R^2$ plane but does not always lead to the "appearances." Appearances are defined as lists wherein $a_1 > 0$, etc. Since e can vary by multiples of w, leading to the same visual appearance, $b_k$, but translated, i.e., $b_k = a_{k+q}$ for some integer q, for k=1 to K, identical partitions of a real line may lead to different enumerations of the intervals and different histogram sequences.

Note that the notation $R^2$ as used here denotes the two dimensional Carestian co-ordinate plane, NOT as is known in the statistical arts, the $R^2$ that is a squared multiple correlation also called the coefficient of determination as defined by $R^2=1-\text{Var}(z)/\text{Var}(y)$.

An existence of an appearance for a data sample is equivalent to a system of inequalities. The system that corresponds to the existence of one appearance leads to systems associated with all possible appearances. The inequalities lead to a partition of the space of end point and width values, $\{(e, w)\}$, into histogram sequence level sets in $R^2$. If $R^2$ is restricted then histogram sequence level sets corresponding to translations of other histogram sequences can be eliminated to obtain a minimal exhaustive domain for level sets for arbitrarily numerous although finite in number subsets of appearance level sets in $R^2$.

Each level set may be defined by the: (1) vertices of the polygon of intersecting lines as previously described; or (2) binding constraints for each feasible appearance together with all of the other non-binding constraints for the sample values the placement of which leads to a non binding linear inequality. Thus, an appearance of a histogram is simply the list of frequencies beginning and ending with first and last frequencies that are positive.

Exemplary Histogram Computing Methods

Figure 2:
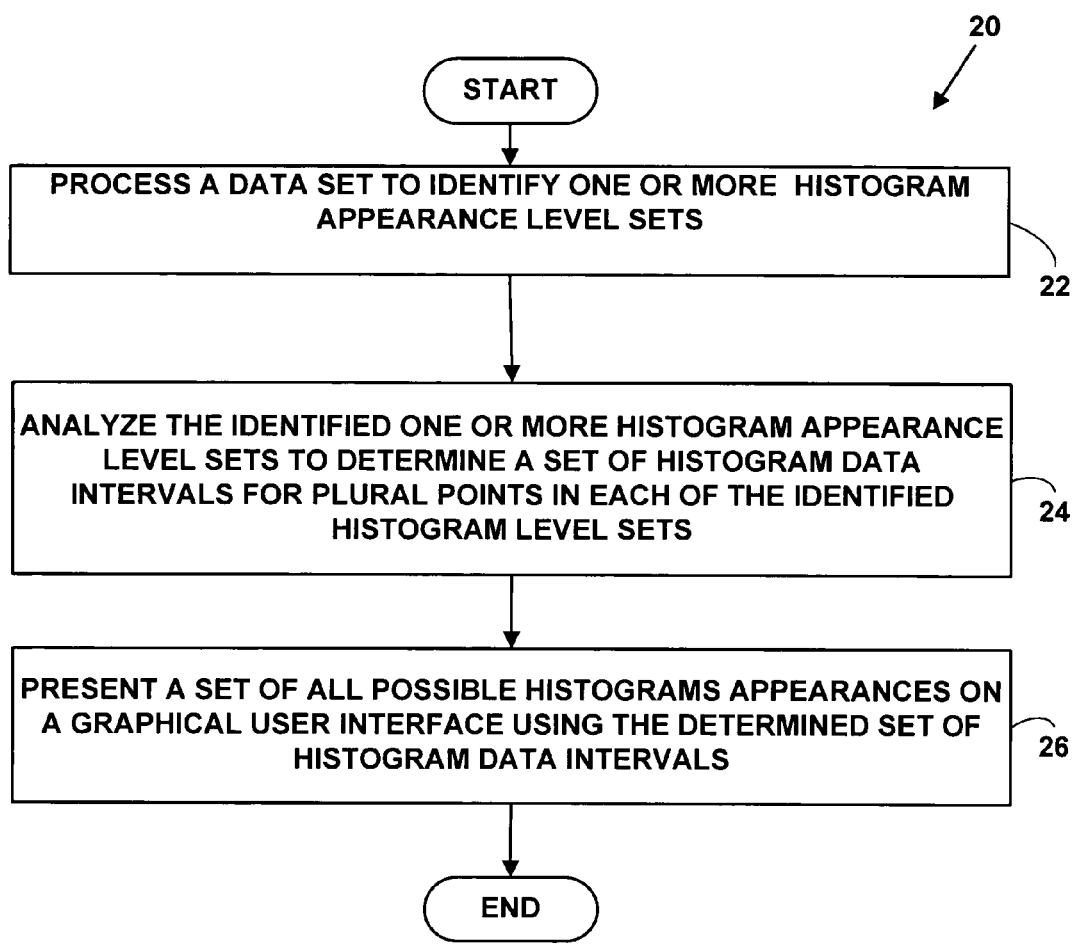
FIG. 2 illustrates a method for determining all possible histograms from a data sample.

FIG. 2 is a flow diagram illustrating a Method 20 for determining all possible histograms in a data sample. At Step 22, a data sample is processed to identify one or more histogram appearance level sets. At Step 24, the identified histogram appearance level sets are analyzed to determine a set of possible histogram data intervals for plural points in the identified histogram appearance level sets. At Step 26, plural histogram appearances are presented on a graphical user interface using the determined set of possible histogram data intervals.

In Method 20, determining all possible histograms includes determining polygons of pairs of values. Only a well defined subset of histogram appearances that is finite in number can be determined. Such a determination corresponds to finite numbers of polygon level sets as is described below. An interior, edges and vertices of polygons correspond to slightly different situations. An edge or vertex differs from an interior with respect to some sample values being equal to some interval end points, and, moreover, being boundaries between different appearance level sets.

Method 20 is illustrated with several exemplary embodiments. However, the present invention is not limited to exemplary embodiments, and other embodiments can be used to practice the invention.

In one exemplary embodiment, at Step 22, histogram appearances for histograms having data interval widths greater than or equal to any strictly positive value, for histograms with equal width intervals are identified and extracted. The appearance of a histogram is an enumeration of data counts in each interval, such that a first and a last counts is positive, and not enumerating counts of zero before the first positive count or after the last positive count. The enumeration of the first positive count is one (1). The first positive count is the count associated with an interval with a smallest sample value.

In another exemplary embodiment, at Step 22, histogram appearances having at most K intervals between and including a first and a last that have sample points, for histograms with equal width intervals, are identified and extracted. The appearance of a histogram in this embodiment is the same as in the previous embodiment, namely an enumeration of data counts in each interval, such that the first and last counts are positive and not enumerating counts of zero before the first positive count or after the last positive count. The enumeration of the first positive count is 1 (one). The first positive count is associated with the interval with a smallest sample value.

In another exemplary embodiment, at Step 22 different enumerations of the intervals and counts as well as including an arbitrary number of leading or trailing counts of zero are used as well as equal or different numbers of both leading and trailing counts of zero. Certain applications may benefit from such an embodiment, such as a simultaneous analysis of appearances of two or more samples as well as an analysis of histogram appearances of multidimensional data samples, multidimensional histograms, or multidimensional histogram appearances. However, in such instances, it is not expected that several samples all will have data values in a same first interval or that for multidimensional data samples, that a same first interval will have data values in every dimension.

In another exemplary embodiment at Step 22, all possible histogram appearances having plural different or equal location parameter values, interval widths, numbers of intervals between and including a first and last interval having sample points are identified.

In another exemplary embodiment at Step 22, all possible equal interval width and location combinations are identified that lead to a given histogram appearance, for a given data sample, if possible. This identification includes polygonal subsets in a two dimensional plane of real numbers, wherein one dimension corresponds to a location parameter and another dimension corresponds to an interval width parameter Hence an identification of all possible histograms associated with an appearance, for a given sample are determined.

In another exemplary embodiment at Step 22, vertices of polygons formed by the intersection of a set of straight lines in the plane $R^2$ are identified. This is not the same as simply solving all of the pairs of straight lines and listing the vertices. What is provided is the set of subsets of the points of intersection that are associated with each polygon. This embodiment can also be used in isolation, apart from Method 20 for finding possible histogram appearance level sets of location and width parameter combinations. The polygon vertices make explicit a polygonal partition of a plane resulting from a set of lines, where lines are defined as level sets of linear functions. Such a stand alone procedure may have applications in finite element numerical methods.

In another exemplary embodiment at Step 22, vertices of regions formed by an intersection of a set of level curves in a plane $R^2$. This is not the same as simply solving for the intersection of all of the pairs of graphs and listing the vertices. The set of subsets of points of intersection that are associated with each level set polygon this formed is identified. The embodiment can also be used in isolation apart from Method 20 for nonlinear level sets. Such a stand alone procedure may also have applications in finite element numerical methods.

In another exemplary embodiment at Step 22, all one dimensional histogram appearances using constant width intervals are identified. The constant width intervals are greater than or equal to a pre-determined positive minimum width.

In another exemplary embodiment at Step 22, all histogram multidimensional appearances with data cell boundaries that are parallel as well as not parallel to data space axes are identified. The multidimensional widths may satisfy separate pre-determined positive minimum widths for each dimension or a common positive minimum width. The multidimensional interval widths may all be the same or may be independent of one another.

Additional details for the various described embodiments of Step 22 are presented. A data sample, $(x_i)$ is used. Let $R^2/H(\delta_1)$ denote $R^2$ from which a horizontal band, $H(\delta_1) = \{(e, w) | |w| < \delta_1\}$, wherein $\delta_1$ is a pre-determined positive value, that has been deleted. A system of equations is illustrated by Equation (3).

$$\{x_i = e + kw | i, k \text{ integers}; i = 1, \ldots n^* \text{ the number of sample values}\};$$

$$k = 1, 2, \ldots K;$$

$$K \leq [\text{Range of } <x_i>/(\text{Min}_{xi \neq xj}|x_i - x_j|)] + 1\}. \quad (3)$$

The system of equations given by Equation (3) partition a deleted plane, $R^2/H(\delta_1)$, into at least three kinds of histogram sequence level sets as is illustrated in Table 1. However, the present invention is not limited to the system of equations in Equation (3) or the three kinds of histogram sequence level sets illustrated in Table 1 and other systems of equations and more or fewer kinds of histogram sequence level sets can also be used to practice the invention.

TABLE 1

| | |
|---|---|
| i) | interiors of polygon and cone intersections; |
| ii) | edges of polygon and cone intersections; and |
| iii) | vertices of polygon and cone intersections |

Considering the Equations indicated by Equation (3) and Table 1, for each $x_i$, (or $x_{(i)}$) inequalities $(e+(k-1)w \leq x_i < e+kw)$ define cones in (e, w) that place a point $x_i$ in a $k^{th}$ interval, $[e+(k-1) w, e+kw)$. This increases by one a $k^{th}$ term in a histogram sequence, $h_k$. The intersections of these cones create a polygonal and conic partition of $R^2$. By definition, within an interior of each polygon or cone of the intersections there are no line boundaries of a form "$x_i = e + kw$." Consequently, for all (e, w) location and width parameter pairs in an interior of a polygon or intersection of cones, each sample value is within the interior of an interval having a fixed index, "k" or "$k(x_i)$" or "$k(x_{(i)})$" for some histogram sequence. Hence intersection interiors and similarly edges and vertices are level sets for histogram sequences.

The interiors are the (e, w) level sets such that no histogram interval end point equals any data value, $x_i$. The edges are (e, w) level sets such that one histogram interval endpoint equals a data value. The vertices are the (e, w) level sets such that two or more histogram interval end points equal data values.

In one embodiment, a positive affine transformation is used to map a value set of a sample into the interval [1, 2], wherein a minimum value is transformed to a value of one and a maximum value is transformed to a value of two. The interval "[a, b]" is a closed interval and includes both of its end points. The maximum value in a sample is transformed to the value two. The minimum value is transformed to one. All the other values are in between 1 and 2. However, the present invention is not limited to this embodiment and other transformations and other intervals can also be used to practice the invention. An inverse transform returns transformed values in the interval [1, 2] to a range of sample values. Repeated values in the sample, if any, show up when histogram appearance is created with a transformed sample, or the inverse transform (e, w) values and the original sample points.

A transformed space including the sample as a subset of [1, 2] is denoted by $R^{2*}$ and transformed sample points and values are denoted by $x_i^*$. The use of parentheses around the index, $x_{(i)}^*$, indicates rank ordered sorted values or sample points. In the transformed space wherein sample values are in the interval [1, 2], e, w, $\delta_1$, $\delta_2$ are meaningful when subjected to the same unique positive affine transformation or an appropriate inverse, that brought the sample into the interval [1, 2]. Note that for the appropriate transformation and inverse transformation for interval widths are Mw or w/M and no translation is done for transformations of the interval width.

The equations indicated by Equation (3) and Table 1 lead to a partition of (e, w) values into histogram sequence level sets for a particular sample. Visual appearance level sets are unions of disjoint level sets for infinitely many histogram sequences that all have the same visual appearance However only one histogram sequence, $h_k$, can be an appearance, after truncating infinity many zero terms coming before the first positive count or after the last positive count. Zero terms between the first and the last positive counts are not truncated or deleted. Either sketching the situation on a usual (x, y) plane identified as (e, w) or shifting e by multiples of w makes this clear.

The equations indicated by Equation (3) and Table 1 lead to level sets for an arbitrary number of histogram sequences with a same visual appearance. However, in the transformed space most of $R^{2*}$ is excluded so that one representative histogram sequence level set remains for each appearance.

Consider the space of transformed values. Define B as an upper bound for a maximum distance from an origin, (0, 0), of the intersection of any of lines of the form "$e^*+kw^*=x_i^*$." Here B=an intersection of lines "$e^*+kw^*=1$" and "$e^*+(k-1)w^*=2$". A formula for B in terms of K (or K≡the smallest integer greater than or equal to 1+1/(min transformed width, $\delta^*$)), or 1+Range/(minimum untransformed width, $\delta$)) is shown in the figures. The bounded subset, $B^*$ of $R^{2*}$, indicated by Equation (4), below, includes the level sets for all histogram sequences for which $a_n>0$ for n=−K and $a_n=0$ for n<−K. K is an integer and $B^*$ may be made as large as is feasible for a computing system. $B^*$ explicitly extends the patent to all computable histogram sequences. However, in most instances only appearances are needed and only a minimal $\{(e^*, w^*)\}$ set, $D^*$ or $D_1^*$ union $D_2^*$ is used.

$$B^* = [-(B+1),(B+1)] \times [-(B+1),(B+1)] / H(\delta) = \{(e, w) | |e| \leq (B+1), 0<\delta \leq |w| \leq (B+1)\}. \tag{4}$$

Since a horizontal strip of width two $\delta^*$ is omitted, $B^*$ is comprised of two rectangles including all intersections of lines "$e+kw=x_i^*$," for k=1 to K. Polygons formed by these lines within B are level sets for histogram sequences wherein an index for an interval including $x_{(l)}^*$ is at least (−K).

Figure 3:
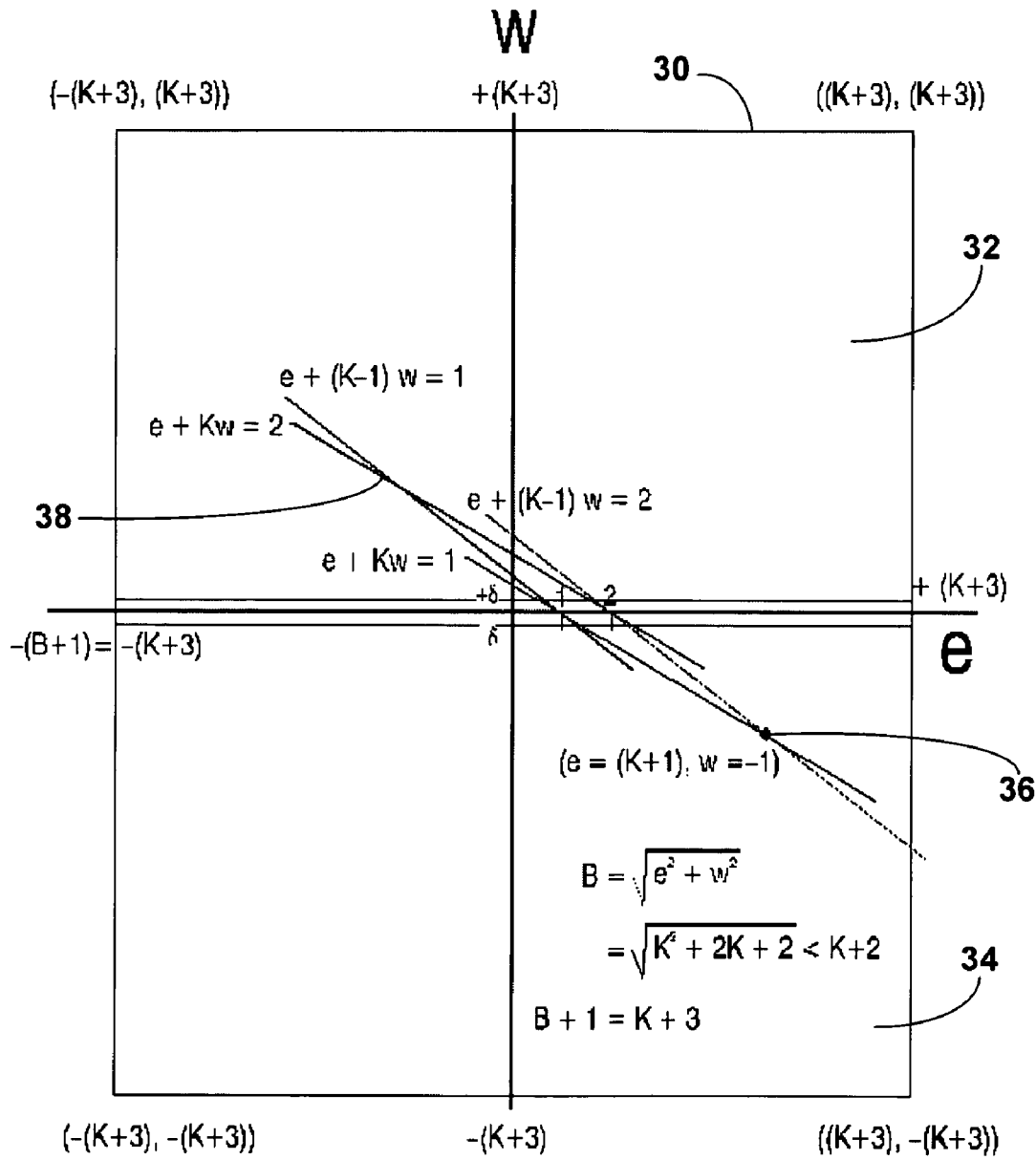
FIG. 3 is a block diagram graphically illustrating a box in $R^{2*}$.

FIG. 3 is a block diagram 28 graphically illustrating a box in $R^2$.

The notation indicated by Equation (4) defines a bounded subset of $R^2$ having level sets for a finite set of histogram sequences. The bounded subset in Equation (4) is a square 30 including two rectangles 32, 34 within which level sets are determined for a finite but representative and well defined subset of all histogram sequence level sets.

Consider the subset defined by Equation (4). A transformed space $\{(e^*, w^*)\}$, is transformed according to $e^*=\alpha e+\beta$, $w^*=\alpha w$ for $\alpha$, $\beta$ so that Min $\{x_i\} \to 1$, Max $\{x_i\} \to 2$, etc. $\delta_1^* = \text{Min}_{xi^* \neq xj^*} |x_i^* - x_j^*|$, or any value $\epsilon$ (0, 1). The system of inequalities (1) also applies within $B^*$ to show that a partition of rectangles in $B^*$ by lines $x_{(i)}^* = e^* + kw^*$ leads to distinct, connected polygonal level sets for histogram sequences.

Note that FIG. 3 is drawn to be easily readable and understandable. However the point of intersection marked with a dot 36 actually would be rotated counter clockwise very close to the upper boundary and upper right hand corner of the lower rectangle 34. If this is done, then the intersecting lines will be nearly parallel, as in fact they really are, but then the figure would be too difficult to read. The other marked intersection 38, to be exactly correct, similarly should be rotated counter clockwise nearly to the lower boundary and lower left hand corner of the upper rectangle 32.

Figure 5:
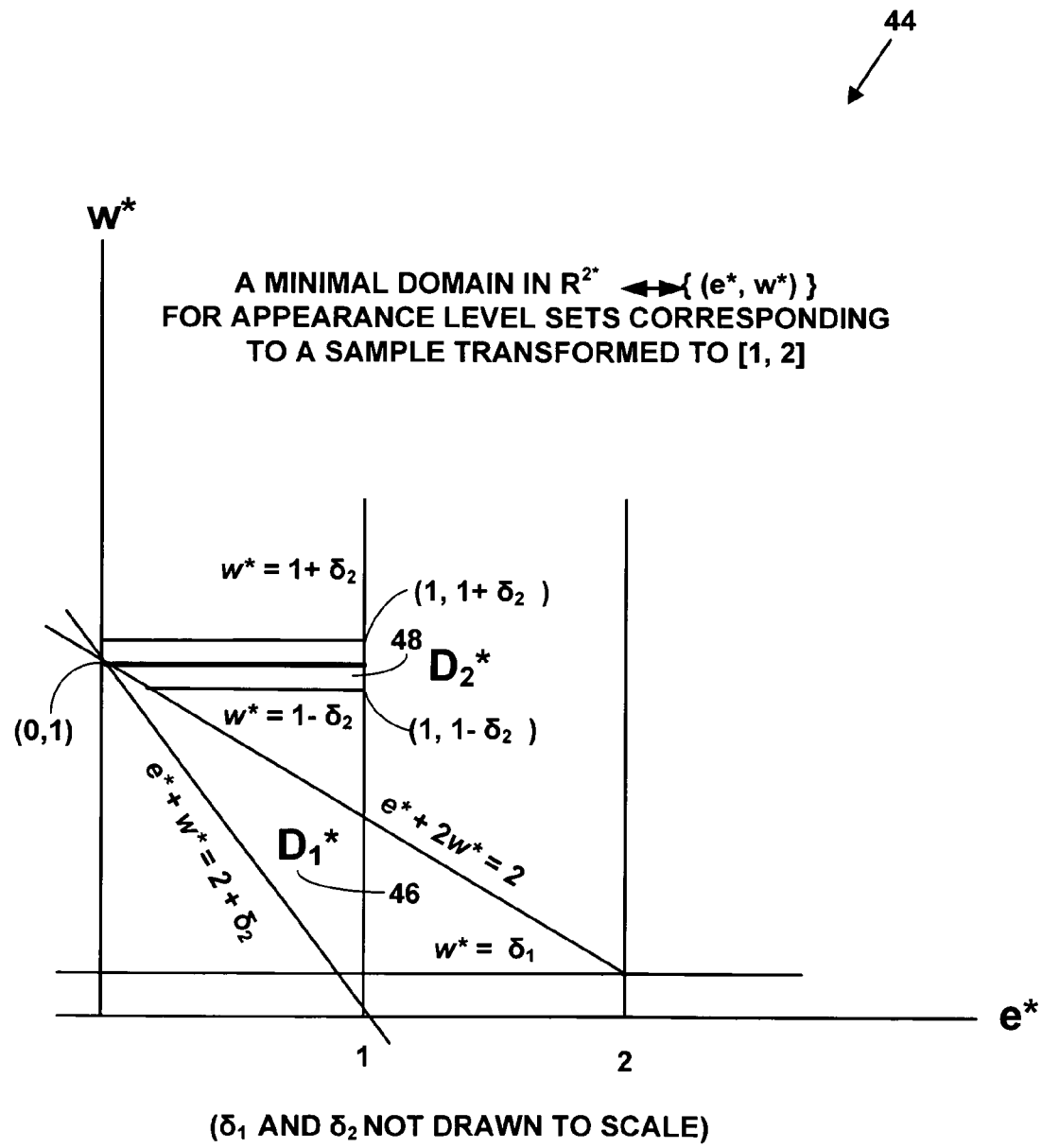
FIG. 5 is a block diagram graphically illustrating a minimal domain in $R^{2*}$.

Equation (5) defines a minimal subset of $\{(e^*, w^*) | (e^*, w^*) \in R^{2*}\}$ within which each visual appearance has only one level set for the sequence such that $h_k=0$ for all $k \leq 0$ and $h_1 \geq 1$ as is discussed below. Equation (5) defines a subset of $R^{2*}$, $D^*$, that is sufficient. FIG. 5 shows necessary conditions that are used for one embodiment. That is, regions $D_1^*$ and $D_2^*$ shown in FIG. 5 are sets of $(e^*, w^*)$ points of which a dense subset is necessary for one embodiment to be capable of having points from every level set of every appearance for any sample. However, other conditions can also be used and the present invention is not limited to these conditions.

Transformed space $\{(e^*, w^*)\}$, transformed according to $e^*=\alpha e+\beta$, $w^*=\alpha w$ for $\alpha$, $\beta$ so that Min $\{x_i\} \to 1$, Max $\{x_i\} \to 2$, etc. $\delta_1 = \text{Min}_{xi^* \neq xj^*} |x_i^* - x_j^*|$, or any value $\epsilon$ (0, 1). Subset $D^*$, $\{(e^*, w^*)\}$, of the $R^{2*}$ transformed $R^2$ representation of $\{(e, w)\}$ is defined as shown below in Equation (5).

$$D^* = \{(e^*, w^*) | 0 \leq e^* \leq 1 < e^* + w^*, \delta_1 \leq w^* \leq 1+\delta_2\} \tag{5}$$

Figure 4:
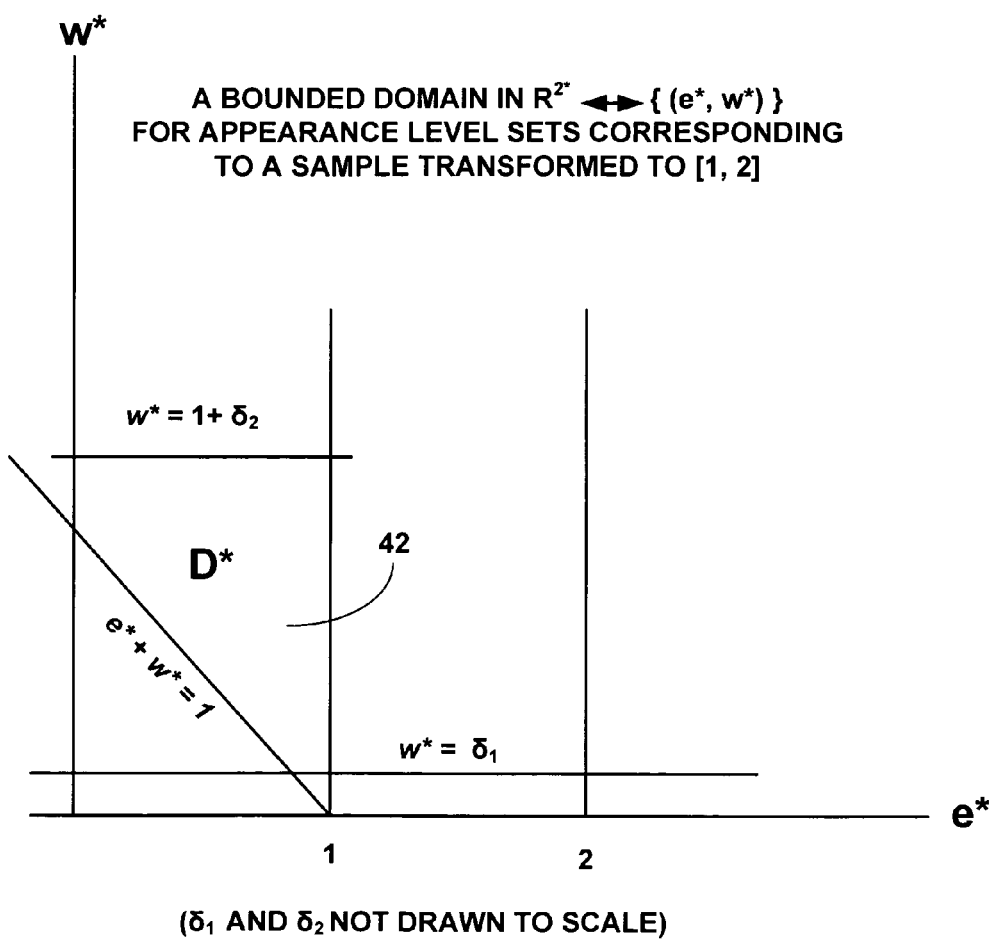
FIG. 4 is a block diagram graphically illustrating a bounded domain in $R^{2*}$.

FIG. 4 is a block diagram 40 graphically illustrating a bounded subset in $R^{2*}$.

A bounded subset $D^*$ 42 for $\{(e^*, w^*)\}$ in transformed space $R^{2*}$ is sufficient for finding exactly one level set for a well defined subset of possible histogram appearances of a transformed sample in the interval [1, 2], for cell widths $\epsilon [\delta_1, 1+\delta_2]$. Moreover, a histogram sequence for each appearance level set is the one for which $h_1>0$ and $h_k=0$ for all k<1. With $\delta_1$, defined as $\delta_1 = \text{Min}_{xi^* \neq xj^*} |x_i^* - x_j^*|$, above, the finest partition counts the closest distinct values in adjacent half open cells).

To prove that $D^*$ 42 is sufficient to reveal all possible histogram appearances, notice that each excluded part of $R^{2*}$ is associated with at least one of the following three possibilities illustrated in Table 2. However, more or fewer possibilities may also be used and the present invention is not limited to these possibilities.

TABLE 2

1. Appearances or situations that are not of interest;
2. Partitions that are identical to partitions generated from (e*, w*) values in D*; or
3. Interval and histogram sequences leading to appearances that are identical to appearances from (e*, w*) values that are in D*.

The histogram sequence that is associated with a level set in D* is one defined to be an appearance of a histogram, namely the sequence for which $h_1 \geq 1$ and $h_k = 0$ for k<1, etc.

In the $R^{2*}$ plane, Table 3 illustrates exemplary steps for defining D*. However, more or fewer steps for defining D* may also be used and the present invention is not limited to these steps.

TABLE 3

A. Undefined or not of interest
  1. Exclude w* = 0 since histograms and appearances are undefined for w* = 0.
  2. Exclude $0 < w^* < \delta_1$, (or $0 < |w^*| < \delta_1$) since histograms with small interval widths are not of interest.
B. Same Partition of $R^1$
  3. Exclude w* < 0 (or w* ≦ $-\delta_1$, in view of (2) above) since the partition for |w*| is identical.
  4. For $\delta_1 \leq w^* \leq 1$, exclude {(e*, w*) | e* < 0 or 1 < e* and $\delta_1 \leq w^* \leq 1$}. For $\delta \leq w^* \leq 1$, for all e* not within [0, 1] there exists e# included in [0, 1] such that e# = e* ± q w*, wherein q is an integer. Moreover, e# ≦ 1 < e# + w. Hence for all e* not included in [0, 1], there is an e# in D* leading to the same partition.
C. Same Histogram Appearance
  5. Exclude $w^* > 1 + \delta_2$, for small $\delta_2 > 0$. w* = 1 leads to histogram appearances of the form (n − p, p), p an integer, $1 \leq p \leq (n - 1)$. For completeness, half open intervals [_, _), are used with $\delta_2$, to obtain the appearance (n).
  6. For $1 < w \leq 1 + \delta_2$ exclude {(e*, w*) | e* < 0 or 1 < e* and $1 < w^* \leq 1 + \delta_2$}. For w* such that $1 < w^* \leq 1 + \delta_2$, for all e* not within [0, 1] there exists e* included in [0, 1] leading to the same appearance, even if not the same partition.
  7. Exclude {(e*, w*) | e* + w ≧ 1} since $a_1 \geq 1$ and the use of ½ open intervals, [_, _) requires 1 < e* + w*.

The equations indicated by Equation (3) and Table 1 also applies within D* to show that a partition of D* by lines x*(i)=e*+kw* leads to distinct, connected polygonal level sets for histogram sequences with an additional requirement that h1≧1. That is, e*≦1<e*+w*, together with x*(1)=1=>h1≧1 and hk=zero for all k<1. Hence a histogram sequence corresponding to a polygon level set in D* corresponds to a histogram appearance.

Otherwise uninteresting histogram appearances of the form (n–p, p), 0≦p ≦n–1, for {(e, w)|2<e+2w, and e+w≦2$\delta_2$} are included simply to account for all of the possibilities and to have one level set for each histogram appearance for data interval widths greater than some minimum; or for all appearances having at most K intervals between and including the first and the last intervals having sample points, wherein K is a prescribed maximum number of such intervals.

A sufficiency of D* for having (e*, w*) values leading to every appearance of interest of a sample, without disjoint level sets for histogram sequences that are translations of the appearance is a consequence of Table 3. In one embodiment, for a fixed sample, all of D* is not necessary. For a fixed sample, a finite set having one point from each appearance level set is sufficient for calculating and listing all of the histogram appearances for a sample for interval widths greater than or equal to a pre-determined positive minimum value, or for a prescribed maximum number of intervals between and including the first and the last interval that include sample points.

A necessary condition for subsets, D**, of D*, to have a representative for every histogram appearance for all possible samples is presented. This condition is important because also it leads to showing the inadequacy of other methods of finding all of the appearances for all possible finite samples for histogram data intervals having a width greater than or equal to a prescribed positive minimum value; or appearances having at most some prescribed integer number of intervals between and including the first and the last that include sample points.

Working in the range [0, 1] of the transformed (e*, w*) values, instead of the untransformed space of the sample and corresponding (e, w) values, makes the most difference in finding minimal representative sets for {(e, w)}, for arbitrary samples. In the untransformed {(e, w)} space, for arbitrary samples, arbitrarily large numbers of selections from an arbitrarily large range are present. In $\{(e, w)\} \subseteq R^2$, a dense subset of $R^2$, w>zero is needed, instead of a dense subset of part of D*. Without transforming the (e, w) values to the interval range [1, 2], a dense subset of $R^2$ is necessary.

FIG. 5 is a block diagram 44 graphically illustrating a minimal domain in $R^{2*}$.

D** is a subset of D* such that location and width values for any possible appearance for any sample can be found. In finding all histogram appearances via (e*, w*) values from a subset D** of D*, D is a union of a dense subset, $D_1^{}$, of $D_1^*$ 46 together with a dense subset, $D_2^{**}$, of $D_2^*$ 46, an arbitrarily thin strip including a neighborhood of a line from (0, 1) to (1,1). The (e*, w*) points in $D_1^{}$ and $D_2^{}$ lead to the calculation of all of the histogram appearances for any sample, for cell widths equal to or exceeding some prescribed positive lower bound, $\delta$, in the transformed sample space, [1, 2]. Replacing a constraint w≧a minimum width value with a constraint 2<e*+Kw* restricts appearances to those having at most K intervals between and including a first and a last that include data points, instead of appearance for histograms with a constraint on interval width.

For particular sample, there are finite subsets of D* that have (e*, w*) values leading to every possible histogram appearance for data interval widths greater than or equal to any positive lower bound, $\delta$. In the context of all possible samples, however, if any neighborhood included in the subset, $D_1^*$ 46 of D*, is left out namely $D_1^* = \{(e^*, w^*) | 0 \leq e^* \leq 1 < e^* + w^*, e^* + 2w^* \leq 2, \text{ and } 0 < w^*\}$, then there exists a sample and a histogram appearance that will be revealed only by the (e*, w*) values included in the excluded neighborhood.

Consider an arbitrary sample with appearance ($a_1, a_2, \ldots a_K$) corresponding to a level set for which the excluded neighborhood, N, is a proper subset of this level set, L(S, ($a_t$)) so that L(S, ($a_t$))/N is not empty. Consider an new sample obtained by augmenting S with the points $\{x_{q^*}, x_{q+1^*}, x_{q+2^*}, x_{q+3^*}\}$, defined below, with $x_q^* < x_{q+1}^* < x_{q+2}^* < x_{q+3}^*$ such that the level set separating $\{x_{q^*}, x_{q+1^*}\}$ and $\{x_{q+2^*}, x_{q+4^*}\}$ is included in a neighborhood N. Then the histogram appearance ($a_1, a_2, \ldots a_K$)+(0,0, . . . ,4, . . . 0,0) is included, but the appearance ($a_1, a_2, \ldots a_K$)+(0,0, . . . ,2,2, . . . 0,0) is not.

Specifically, the excluded neighborhood, N, will include a ball of radius r>0, $B((e_{o*}, w_{o*}), r)$, at ($e_{o*}, w_{o*}$). There exists $\delta_o > 0$ such that the points $\{x_q^*, x_{q+1^*}, x_{q+2^*}, x_{q+3^*}\}$ as $x_{q^*} = e_{o^*} + w_{o^*} - \delta_o$, $x_{q+1}^* = e_{o^*} + w_{o^*} + \delta_o$, $x_{q+2^*} = e_{o^*} + 2w_{o^*} - \delta_o$, and $x_{q+3^*} = e_{o^*} + 2w_{o^*} + \delta_o$ may be defined. Then a histogram appearance ( . . . ,2,2, . . . ) will not be revealed with the {(e*, w*)} remaining in D**/N, that is, $B((e_{o*}, w_{o*}), r)$, is excluded.) Hence D** must be dense in $D_1$* 46 where the level sets are polygons that may have arbitrarily small diameters for samples with pairs of arbitrarily close distinct values.

A similar analysis is applied to the level sets, $D_2$* 48, for histograms of the form (n–p, p). For all possible samples, these level sets are trapezoids with the parallel sides having slope –1, within the polygon $D_2$*{(e*, w*)|0≦e*≦1, 2<e*+ 2w*, w*≦1+$\delta_2$. For any sample, a dense subset of the arbitrarily thin strip including a neighborhood of the line segment, $L_2$*, from the point (0, 1) to (1, 1) will have representatives from any trapezoidal level set for any sample.

It can be observed in FIG. 5 that level sets within the part of $D_1$* 46 between e*+2w*=2 and e*+w*=2+$\delta_2$ are trapezoids with the parallel sides having slope –1. Beyond being polygons having sides with slopes of {–1, –½, –⅓, ..., –1/k, ..., 1/K}, the shapes are not obvious for the level sets for e*+2w*<2. K is a maximum number of intervals between and including a first interval and a last interval having data values in them.

For a fixed grid search among possible histogram location and width values for listing histograms or appearances, there are always samples and appearances that will not be found. Consider a transformation of any grid of finitely many grid points to D**. These points will not be dense in $D_1$* 46 union $D_2$* 48, so there exist samples and appearances that will not be found. That is, neighborhoods entirely between the transformed grid points will be excluded. As previously discussed, within these excluded neighborhoods, there will be (e*, w*) points corresponding to samples and appearances that will not be revealed with a grid search.

For Monte Carlo and quasi-Monte Carlo methods known in the art, there are samples and appearances with arbitrarily small probability of being found. There are samples for which some of their appearances have a level set with arbitrarily small area. That is, the level sets constructed in to show necessity of D** have area $\leq 4\delta_{Necessity}^2$ which can be made arbitrarily small. The total area of $D_1$* 46 is $\frac{1}{2} - \frac{1}{2}\delta_1^2$. Since $4\delta_{Necessity}^2 / (\frac{1}{2} - \frac{1}{2}\delta_1^2)$ can be made arbitrarily small, there are samples and appearances with arbitrarily small probability of being found.

In one exemplary embodiment, returning to FIG. 2 at Step 22, histogram sequence level sets for which $h_1 \geq 1$ and $h_k = 0$ for $k \leq 0$ are identified from the histogram appearances. These histogram sequence level sets comprise histogram appearance level sets. These histogram level sets are described by a minimal set of location and width parameters in a transformed sample space, such that each appearance of the data sample has only one level set in D*.

In one exemplary embodiment, At Step 24, the identified histogram appearance level sets are analyzed to determine a set of possible histogram data intervals for plural points in the identified histogram appearance level sets. If no restriction is placed on the intervals for two or more samples, then the possible pairs or sets of histogram appearances that might be used to compare the samples may be the set of all combinations is obtained by selecting any appearance for a first sample, any appearance for a second sample, etc. for two or more samples.

However, significantly different appearances might be a result of slightly different sets of intervals for different samples. It may appear that "apples and oranges comparisons" resulting from different interval widths should not be done. However, preferred simultaneous appearance comparisons may be based on histogram appearances corresponding to a use of identical sets of intervals for all of the data sample. If such comparisons are desired, then a production of well defined subsets of all possible sets of appearances for two or more samples is completed with a restriction that a same set of intervals be applied to all of the samples (as well as a common interval width being greater than or equal to a prescribed strictly positive minimum width; or that the number of intervals between and including the first and the last intervals having positive frequencies be at most a prescribed integer count.

In such an embodiment, at Step 24 sample values are combined. Then level sets for combinations of simultaneous appearances may be obtained by applying analysis to the set of combined sample value sets. This procedure works since if any value shifts from one interval to another, then at least one of the several appearances changes (or, in the multidimensional setting, an appearance in at least one dimension changes.) Realizations of this procedure include combining of sample values before transforming them to the interval [1, 2]; combining of sample values after each sample has been transformed to the interval [1, 2]; or other variations of restricting completely independent interval widths for two or more samples in the context of comparing the appearances for two or more samples.

Note that this embodiment is similar to the procedure for determining the possible multidimensional histograms wherein the same intervals are applied in all dimensions as is described below.

In another embodiment, Step 24 includes analyzing histogram sequence level sets. In such an embodiment, histogram sequence level sets are the one or more identified histogram appearance level sets analyzed with pre-determined set of constraints. The one or more identified histogram appearance level sets are described by a minimal set of location and width parameters in a transformed sample space, such that each histogram appearance has only one histogram appearance level set in the transformed sample space.

At Step 26, a determined set of possible histogram data intervals is used to present plural histogram appearances and/or histogram reports or graphical histograms on a graphical user interface. In one embodiment, the graphical histogram appearances or graphical histograms include multi-colored graphical entities, including, but not limited to, multi-colored bar graphs, line graphs, pie-chart graphs, or other types of multi-colored graphs.

In another embodiment at Step 26, statistical graphics are used to display all the possible histograms of a one dimensional sample using the histogram level sets; or by performing further analysis upon the histogram appearance level sets sorted $a_k$. In one embodiment at Step 26, simultaneous histogram appearances of plural data samples are visually compared by comparing two or more samples with a pair or with a set of histogram appearances, one for each data sample.

In another embodiment, at Step 26 reports are produced and displayed in all configurations and forms of sets of possible simultaneous histogram appearances for several samples subject to the requirement that the each set of simultaneous histogram appearances correspond to a set of histograms using intervals that are identical in the untransformed spaces of each data sample, or in the interval [1, 2] of all of the transformed data samples.

In another embodiment, at Step 26 reports are produced and display in all configurations and forms of sets of possible simultaneous histogram appearances for several samples without the requirement that the intervals of the corresponding histograms are identical.

In another embodiment at Step 26, reports are produced in all configurations and forms of sets of possible simultaneous histogram appearances for several samples requiring for their production the level sets and analysis with or without requirements, restrictions or modifications similar or dissimilar to those already described.

Although polygons included in FIGS. 3-5 may be considered as level sets of polygons, as is illustrated in Table 1, there are at least three kinds of levels sets: polygon interiors, edges without vertices and the vertices. Thus, a point from each kind of level set is used to display all possible appearances for different conventions regarding the equality of a sample point to an interval end point, of which the convention is but one.

Therefore a time required to identify all histogram level sets depends on a cardinality of sample values, n*, not of the sample, n. For very large data samples with a fixed range and gauge, (i.e. number of significant digits, set at 4 or 5,) indicates that many values might repeat and the sample value set could have significantly fewer elements than the sample.

FIGS. 6A-6D are a block diagram 50 illustrating an exemplary histogram appearances generated with Method 20 and (Method 66 illustrated below) for a data sample transformed to [1, 2]. The first column in FIG. 6 is a creation number defined as a polygon counter plus one when a division takes place of an existing polygon, retained by one of new polygons, with other polygon keeping an earlier creation number. The second column is location value "e," the third column is a width "w," the fourth column is a code with "S" for symmetric and "Rev" for a reversal appearance and the remaining columns show the histogram appearance as a list of interval frequencies, $a_k$. The sets of appearance details together with the appearance are presented lexicographically, ordered first ascending on a length of an appearance (i.e., a number of intervals, or, equivalently, the number of frequencies in the list) and second lexicographically descending on the appearances itself, that is, on the list of frequencies $a_k$.

As is known in the art, to present something lexicographically, an alphabetic ordering for the English language, for example, is lexicographic ascending with a<b<c<d< . . . etc. The lexicographic ordering of appearances is similar, but descending, with 20>19>18> . . . >2>1>0. The sample size in this example is 20 so that the maximum frequency for any interval and, hence, any integer in an appearance is 20.

The histogram appearances start with the left side of FIG. 6A with the appearance (20) and after the last element of the left side of FIG. 6A (e.g., 147) wrap around to the first element of the right side of FIG. 6A (e.g., #115, having appearance "10 7 3"). After the last element of right side of FIG. 6A (e.g., #156, having appearance "2 16 2") it continues with the first element of the left side of FIG. 6B (e.g., #124, having appearance "2 15 3"), and so on.

As is illustrated in FIG. 6, there are 243 possible histogram appearances for interval widths greater than or equal to 1.0653, including a number of appearance reversals.

Table 4 illustrates a first exemplary sample of 20 observations from a simulated normal population with a mean of 5 and a standard deviation of 1.887.

TABLE 4

| 1  | $X_{(1)} = X_{14} = 2.3817$ |
| 2  | $X_{(2)} = X_1 = 2.7784$ |
| 3  | $X_{(3)} = X_8 = 2.8475$ |
| 4  | $X_{(4)} = X_{17} = 2.9842$ |
| 5  | $X_{(5)} = X_5 = 3.1774$ |
| 6  | $X_{(6)} = X_6 = 3.3055$ |
| 7  | $X_{(7)} = X_{16} = 3.8954$ |
| 8  | $X_{(8)} = X_{15} = 3.9884$ |
| 9  | $X_{(9)} = X_{20} = 4.0071$ |
| 10 | $X_{(10)} = X_4 = 4.1943$ |
| 11 | $X_{(11)} = X_{13} = 4.3608$ |

TABLE 4-continued

| 12 | $X_{(12)} = X_{11} = 4.9817$ |
| 13 | $X_{(13)} = X_9 = 4.9849$ |
| 14 | $X_{(14)} = X_3 = 5.0316$ |
| 15 | $X_{(15)} = X_{18} = 5.5454$ |
| 16 | $X_{(16)} = X_{19} = 5.7514$ |
| 17 | $X_{(17)} = X_7 = 6.1436$ |
| 18 | $X_{(18)} = X_{10} = 6.5454$ |
| 19 | $X_{(19)} = X_2 = 7.0156$ |
| 20 | $X_{(20)} = X_{12} = 7.7037$ |

Using Method 20, abbreviating histogram appearances by a list of frequencies using the 20 observations in Table 4 includes generating the appearances listed in Table 5. The appearances are presented as tuples of integer counts and not as histogram graphics. The tuples of integer counts are converted to histogram graphics for display at Step 26. Observe that the appearances shown in Table 5 are reversals each other.

TABLE 5

(6, 13, 1), (1, 13, 6)

Table 6 illustrates the first exemplary sample in rank ordered form.

TABLE 6

| $X_{(1)} = 2.05$ |
| $X_{(2)} = 2.27$ |
| $X_{(3)} = 2.50$ |
| $X_{(4)} = 2.95$ |
| $X_{(5)} = 3.18$ |
| $X_{(6)} = 3.41$ |
| $X_{(7)} = 3.64$ |
| $X_{(8)} = 3.86$ |
| $X_{(9)} = 4.09$ |
| $X_{(10)} = 4.32$ |
| $X_{(11)} = 5.68$ |
| $X_{(12)} = 5.91$ |
| $X_{(13)} = 6.14$ |
| $X_{(14)} = 6.36$ |
| $X_{(15)} = 6.59$ |
| $X_{(16)} = 6.82$ |
| $X_{(17)} = 7.05$ |
| $X_{(18)} = 7.50$ |
| $X_{(19)} = 7.73$ |
| $X_{(20)} = 7.95$ |

Using Method 20, abbreviating histogram appearances by a list of frequencies using the 20 observations in Table 6 includes generating the appearances listed in Table 7.

TABLE 7

(10, 7, 3), (3, 7, 10);
(5, 5, 0, 5, 4, 1), (1, 4, 5, 0, 5, 5);
(6, 4, 4, 6), (1, 9, 9, 1);
(5, 5, 0, 5, 5), (2, 7, 2, 7, 2).

Figure 7B:
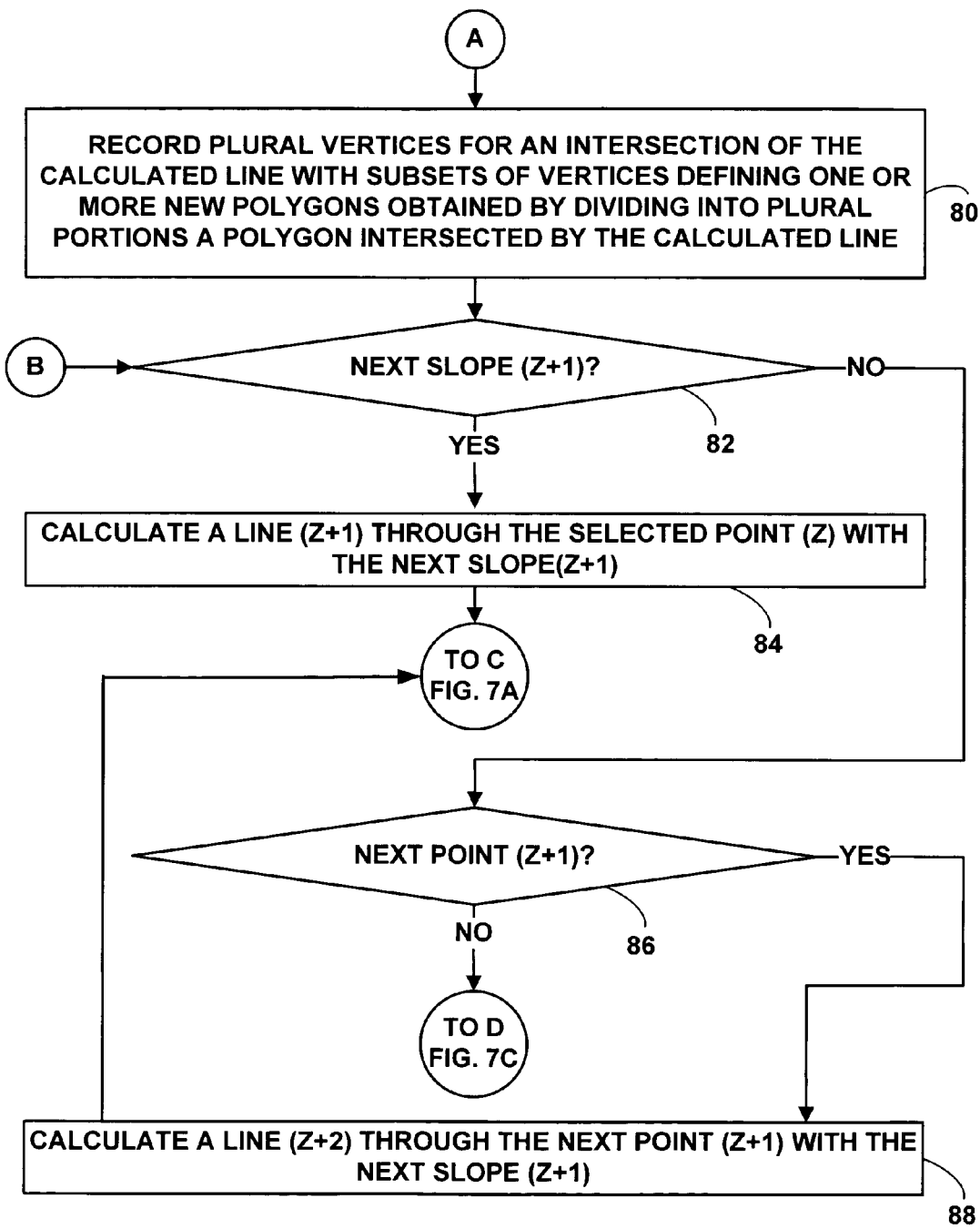

FIGS. 7A, 7B and 7C are a flow diagram illustrating a Method 66 for determining all possible histogram appearances for a data sample. In FIG. 7A at Step 68 an affine transformation is applied to an original value data sample of a data sample to transform all values in the data sample to fit within a pre-determined interval thereby creating a transformed data value set. At Step 70, plural vertices for plural polygons associated with or dependent upon boundaries of the transformed data value set are determined. At Step 72, a first point (Z) is selected from the transformed data value set. At Step 74, a fist slope (Z) from a set of K-slopes is selected.

At Step 76, a first line (Z) is calculated through the selected point (Z) with the selected slope (Z). At Step 78, a test is conducted to determine if the calculated line intersects any of the plural polygons using the determined plural vertices.

At Step 78, if the calculated line intersects any of the plural polygons, in FIG. 7B at Step 80, vertices for an intersection of the calculated line are recorded with subsets of vertices defining one or more new polygons obtained by dividing a polygon intersected by the calculated line into plural portions. At Step 82, a test is conducted to determine if there is a next slope (Z+1) from the set of K-slopes. If there is a next slope (Z+1) from the set of K-slopes, then at Step 84 a next line (Z+1) is calculated through the selected point (Z) and with the next slope (Z+1). If there is not a next slope (Z+1) at Step 82, then Step 86 is executed. At Step 86, a test is conducted to determine is there is a next point (Z+1). If there is a next point (Z+1), then at Step 88, a next line (Z+2) is calculated with the next point (Z+1) and the next slope (Z+2).

If there is not a next point (Z+1), at Step 88, then in FIG. 7C at Step 90, a transformed point from each of plural polygon levels set for which vertices have been recorded is determined. At Step 92, the determined transformed point is used to determine plural histogram appearances corresponding to each histogram level set. At Step 94, the determined plural histogram appearances are presented on a graphical user interface.

In one embodiment, Method 66 is used with a data sample as well as a value set of the data sample. Redundant lines may occur if a value repeats within a sample. Redundant line are processed like any other, however the method will not record any new vertices, since no new intersections can be obtained from a redundant line.

In another embodiment Method 66 is used with redundancy associated with use of the data sample rather than the data sample values is used. The data sample must be used to determine appearances with the obtained level sets. The data sample includes information that is essential for obtaining appearances, information that is absent in the sample value set. The Method 66 can be used with any sub-sample that has the same value set. Redundant lines are considered, but no new intersections or vertices should result from such redundant lines.

Method 66 is illustrated with several exemplary embodiments. However, the present invention is not limited to exemplary embodiments, and other embodiments can be used to practice the invention.

In such an exemplary embodiment, at Step 68 an original value data sample (e, w) is transformed with a positive affine transformation into the interval [1, 2] to create a transformed data value set (e*, w*). The transformed data value set will have the same histogram appearances as the original data value sample.

At Step 70, plural vertices for plural polygons D* associated with or dependent upon boundaries in the transformed data sample value space $R^{2*}$ are determined. In one embodiment, vertices of plural polygons D* are formed by intersections of all the lines of the form $e^*+kw^*=x_{(i)}^*$. In one embodiment the plural polygons D* are defined by their vertices. In another embodiment, a minimal set of binding inequalities may be used as well to define the plural polygons D*. In one embodiment, the plural vertices of the first polygon D* are (0, 1), $(1-\delta_1, \delta_1)$, $(1, \delta_1)$, $(1, 1+\delta_2)$, $(0, 1+\delta_2)$.

In another embodiment, the plural vertices of the first polygons are shown in FIG. 3, namely {((−K+3),+(K+3)) ((−K+3),1/K)) ((K+3),1/K) ((K+3),(K+3))} and {((K+3),1/K), ((K+3),−(K+3)), (−(K+3),−(K+3)), (−(K+3),−1/K)}. K is a maximum number of intervals between and including a first interval and a last interval having data values in them.

However, the present invention is not limited to this embodiment and other embodiments with other types of polygons with other types of vertices can be used to practice the invention.

At Step 72, a first point $x_{(i)*}$ is selected from the transformed data value set. At Step 74, a fist slope from a set of K-slopes is selected. In one embodiment, the set of K-slopes includes {−1, −½, −⅓, . . . −1/k, . . . −1/K}. K is a maximum number of intervals between and including a first interval and a last interval having data values in them.

However, the present invention is not limited to this embodiment and other sets of slopes can used to practice the invention.

At Step 76, a first line (Z) is calculated through the selected point $x_{(i)*}$ with the selected slope. New lines in the form $e^*+kw^*=x_{(i)}$ are determined for distinct $x_{(i)*}$ values and distinct slopes in the transformed data value sample.

For example, for each data point $x_{(i)}^*$ in the transformed value data value set., consider a line of (e*, w*) or (e#, w#) values, (e*, w*) for the transformation for [1, 2], and (e#, w#) for an arbitrary transformation for [a, b], including the identity transformation, such that the calculated line=e*or#+kw*or#.

At Step 78, a test is conducted to determine if the calculated line intersects an interior of the plural polygons using the determined plural vertices. When a calculated line intersects an interior of an existing polygon D*, at Step 80 plural vertices for an intersection of the calculated line are recorded with subsets of vertices defining one or more new polygons obtained by dividing a polygon intersected by the calculated line into plural portions. The plural vertices include two or more new polygon level sets, defined in terms of their respective vertices. A value $\delta_1$ in the polygon vertices limits a maximum value for k. The indices (i) ranges from 1 to the number of sample values (not sample points). Sample values that have already been considered in a prior instance of $e^*+kw^*=x_{(i)*}$ have no influence on the level sets.

If there is a next slope from the set of K-slopes, then at Step 84 a new line (Z+1) is calculated through the selected point $x_{(i)}$ and with the new slope. If there is not a next slope at Step 82, then Step 86 is executed. At Step 86, a test is conducted to determine is there is a next point $x_{(i+1)*}$. If there is a next point $x_{(i+1)*}$, then at Step 88, a new line is calculated with the new point $x_{(i+1)}^*$, and the new slope.

When all distinct points, slopes and lines have been determined, plural polygon level sets are given as polygon interiors, edges and vertices, associated with the polygons defined in terms of sets of vertices. In one embodiment, there are no cones or non-polygon intersections of cones because a polygon, not $R^{2*}$ is used as a starting point.

Within each polygon interior, a median location e* and width w* defined as an ordinary average of the coordinates of the vertices is determined. For example, if there are five vertices, then the e* values for each of the five (e*, w*) vertices are averaged to obtain the value that we call the median e* value. Similarly a median w* value is obtained. However any interior point may be chosen and the present invention is not limited to this embodiment.

If there is not a next point $x_{(i+1)*}$, at Step 88, then in FIG. 7C at Step 90, an (e*, w*) point from each of plural polygon levels set for which vertices have been recorded is determined. At Step 92, the determined (e*, w*) point is used to determine plural histogram appearances corresponding to each histogram level set.

In another embodiment, an inverse transformed point can also be used to determine the same plural histogram appearances as determined for the original sample (and provide a corresponding histogram in the original sample space). If there are repeated values, then the corresponding appearance frequencies are increased accordingly.

In another embodiment, if transformed location e* and transformed width w* values are applied to the original data value sample after having been transformed to the [1, 2] transformed data sample, the resulting histogram appearances will include repeated values and will be correct histogram appearances for the original data value sample. The ordering of the histogram appearances by the number of intervals, K, and within the same number of intervals, lexicographically may be an additional step added to Method 66. However, the present invention is not limited to such an embodiment and the present invention can be practiced either with or without additional steps added to Method 66.

In an alternative embodiment, a starting domain may be composed of two or more disjoint polygons. For example, if a finite set of histogram sequences is desired then a starting point may include rectangles having the corners: {(−(B+1), δ), ((B+1), δ), ((B+1), (B+1)), (−(B+1), (B+1))} and {(−(B+1), −δ), ((B+1), −δ), ((B+1), −(B+1)), (−(B+1), −(B+1))} etc. B is defined above.

At Step 94, the determined plural histogram appearances are presented on a graphical user interface. At Step 94, printed reports may be also produced based on analyses and sorting of all possible histogram appearances, including transformation of interval location and width combinations corresponding to transformed sample values in the interval [1, 2] back to interval locations and widths for the original data values.

Additional details of other embodiments of the invention are now described. Such embodiments may also be practiced with Methods 20 and 66. However, the present invention is not limited to these other embodiments.

In such other embodiments, appearance reversals depend on symmetry. The terms "symmetric" and "symmetry" usually are applied approximately. For example, if a sufficiently large sample from a Normal population is approximately symmetric, often it might be described or referred to simply as "symmetric."

A sample, S, is "exactly" symmetric if the points may be exhaustively paired so that the sum of every pair is the same, equal to twice the median, of the sample. That is, they may be rank ordered as $x_{(i)}$ so that $x_{(i)}+x_{(n+1-i)}=2M$, for i=1, 2, ... n. (Note: the sample values S* might be exactly symmetric while the sample is not.)

The following are deemed equivalent to exact symmetry. A sample is exactly symmetric if there is a rank ordering, $x_{(i)}$, of the sample points such that: (1) $x_{(n+1-i)}+x_{(i)}=2M$; (2) $M-x_{(i)}=x_{(n+1-i)}-M$; and (3) $x_{(n+1-i)}=2M-x_{(i)}$.

All histogram appearances are accompanied by their reversals if and only if the sample is exactly symmetric. Exact symmetry implies that for any interval width, a reversal of all appearances occurs. Conceptually, if a sample is exactly symmetric, then reflecting a partition across a median reverses an appearance. However all equal length partitions can be defined by a beginning point and a width, so that a reflection of an equal interval width histogram partition is equivalent to a change in the location parameter e.

A sample is approximately symmetric if there exists an appearance with three or more intervals such that the reversal also is an appearance. That is, a discrete definition of the presence of some symmetry is an occurrence of an appearance reversal with three or more intervals. In such an embodiment, a mean becomes a least squares point, not the median of the middle two values or the middle value, etc. Various decompositions are possible into approximately symmetric sub samples, or approximation of a sample by another set of numbers that is symmetric and having a least squares deviation from a sample. However the presence or absence of at least one reversal gives an immediate signal of reaching or failing to reach a threshold indicator of approximate symmetry. Beyond this threshold, there may be other significant details to discover.

In one embodiment, there exists a data sample such that an appearance and its reversal are possible if and only if there is a linear program with constraints inequalities in the location parameter, width parameter and sample points corresponding to an appearance(s) and reversal(s).

A more detailed structure of reversals may be obtained from the different deviations of the pairwise medians, $(x_{(i)}+x_{(n+1-i)})/2$, as is illustrated in Equation 6.

Define the $i^{th}$ pairwise median, $M_i=(x_{(i)}+x_{(n+1-i)})/2$.

$M_{(i)}$=rank ordered $M_i$ $w_i=(M_{(i+1)}-M_{(i)})/2$ $w_{(i)}$=rank ordered $w_i$. (6)

For Equation 6, there are no reversals for w: $0<w<w_{(1)}$. New reversals emerge for w: $w_{(i)}<w<w_{(i+1)}$, i=1, ... # Distinct $w_i$'s−1, as the interval widths open up from $w_{(1)}$ to $w_{(max)}$. For samples with no repeated values, all appearances are accompanied by their reversals for w: Max $\{x_{(n-1)}-x_{(1)}, x_{(n)}-x_{(2)}\}<w$, since such widths lead to appearances of the form (p, n*−p) for p=1 to n*−1, where n*=the number of distinct sample values.

If $x_i$ is exactly symmetric then $w_{(i)}\equiv 0$ for all i and all possible appearances are accompanied by their reversals. The existence of interesting reversals may depend on the relationship between $0<w<\min\{|x_i-x_j|x_i\neq x_j\}$ and the $w_i$s identified above. If $w_{Max}<\min\{|x_i-x_j|x_i\neq x_j\}$, then all interesting appearances have reversals.

There does not exist a sample such that the appearances (1, 2,3,4) and (4,3,2,1) are both possible. The associated Linear Program is not feasible, wherein the sample values as well as the location and width parameters are all decision variables.

Pairs of appearances like (1, n−2, 1) and ((n−2)/2, 2, (n−2)/2) or ((n−1)/2, 1, (n−1)/2) are called "mode inversions." Consider the second example (Tables 6 or 7) involving an exactly symmetric sample that has the reversals (10,7,3) and (3,7,10) corresponding to a sample S, <$x_i$>. Consider a derived sample, S', defined as <$x_i$+Kw|$x_i$ ∈ S> wherein K≡integer least upper bound of (Range (S)/w) (i.e., a ceiling of (Range (S)/w).) Then S<Union>S' will have "saw tooth" appearances (among others) such as (10,7,3,10,7,3) & (3,7,10,3,7,10). ("<Union>" is the operation of combining samples, denoted by <$x_i$>. With "< ... >" this operation is distinguished from the "Union" operation of combining of sets.).

Let $e_1$ & $e_2$ denote the locations such that $|e_1-e_2|<w$ and such that the appearances for S are (10, 7, 3) & (3, 7, 10) respectively for $e_1$ and $e_2$. Define S"=(x; x+Kw+|$e_1-e_2$||x ∈ S}. Then S" will have, among others, the appearances (3,7,10, 10,7,3) & (10,7,3,3,7,10); (or possibly (3, 7, 10, 0, 10, 7, 3) & (10, 7, 3, 0, 3, 7, 10).) Possibly appearances (3, 7, 20, 7, 3) and (10, 7, 6, 7, 10) also can be obtained with a variation on this approach. Note also that moving between the mode inversions is accomplished only by varying the location parameter. For exactly symmetric samples, the (e, w) combinations for reversals may be obtained from a shift of location only, leaving w unchanged. For all appearance reversals that happen with the same interval width, from a shift of location, there is are samples of twice as many points, as described above, having the mode inversion described above.

A histogram appearance, $a_k$, is exactly symmetric if counts satisfy: $a_k=a_{K+1-k}$ for k=1 to K. If K is even then this means $a_1=a_K$, $a_2=a_{K-1}$, $a_3=a_{K-2}$ ... $a_{K/2}=a_{K/2+1}$. If K is odd then this means $a_a=a_K$, $a_2=a_{K-1}$, $a_3=a_{K-2}$, ..., $a_{(K-1)/2}=a_{(K-1)/2+2}$ $a_{(K-1)2+1}=a_{(K-1)/2+1}$. A mode inversion of $a_k$, namely $a_k=a_{K+1-k}$ for k=1 to K, does not imply that $a_1<a_2<a_3<\ldots<(a_{K/2}$, K even, or $a_{(K-1)/2+1}$, K odd) or $a_1>a_2>a_3>\ldots>(a_{K/2}$, K even, or $a_{(K-1)/2+1}$, K odd), etc., $a_1 \leq a_2 \leq a_3 \leq \ldots \leq (a_{K/2}$, K even, or $a_{(K-1)2+1}$, K odd) or $a_1 \geq a_2 \geq a_3 \geq \ldots \geq (a_{K/2}$, K even, or $a_{(K-1)/2+1}$, K odd), etc. However it is just such situations that are most conspicuous, for example (10,7,3,3,7,10) & (3,7,10, 10,7,3) (or possibly (10,7,6,7,10) & (3,7,20,7,3) wherein the middle two combine).

Appearances do not directly determine histograms. The same appearance almost always occurs with many width and location parameter combinations. A given appearance corresponds to a polygon of many possible location and width values for histograms all having the given appearance. From this domain, what (e, w) values lead to a histogram that has a mean for the grouped data that equals or is closest to the actual sample mean is determined. Similarly a histogram with grouped data sample vaiance that is equal to or closest to the sample variance may be desired. For a fixed appearance, a line may cut the interior of the polygon level set giving the set of (e, w) values leading to a desired appearance and for which the mean of grouped data equals the sample mean. Then on this line the (e, w) value that optimizes the grouped data variance compared to the sample variance may be sought.

For a fixed width, w, the location, $e^\#$, that minimizes the sum of the squared deviations of each point from its interval midpoint as illustrated in Equation 7.

$$e^\# = [\Sigma_{i=1 \text{ to } n} x_i (\bmod w)]/n - w/2 \quad (7)$$

A squared deviation from $x_i$ to the midpoint for the interval for $x_i$, $[e^\#+(k-1)w, e^\#+kw)$, is the same as the squared deviation from $x_i (\bmod w)$ to $(e^\#+w/2)$ in the interval $[e^\#, e^\#+w)$. The squared deviation minimizing point in this interval for the $x_i (\bmod w)$ values is the mean. This locates $e^\#$ as described above. The average remainder of a set of numbers is not the same as the remainder of the average. Consider $\{1\frac{1}{2}, 2\frac{1}{2}\}$ and the remainders upon division by 1. The average remainder is ½, but the remainder of the average is zero. Also, a location may be found to make the mean or variance, etc., of grouped data the same as, or as close as possible to the actual mean, variance, etc.

For an appearance, $(a_k)$, and a fixed width, w, the location, $e^{\#\#\#}$, below, makes the mean of the grouped data the same as the mean of the actual data as is illustrated in Equation 8.

$$e^{\#\#\#} = [(\text{mean of } x_i) - w(\Sigma_{k=1 \text{ to } K} a_k k + nw/2], \quad (8)$$

provided that the line $(e^{\#\#\#}, w)$ intersects the level set of the appearance $(a_k)$. Equating the mean of $x_i$ to the mean of the data grouped by $[e^{\#\#\#}+(k-1)w, e^{\#\#\#}+kw)$ and solve for $e^{\#\#\#}$. Note that the mean of the grouped data$=(1/n) [e^{\#\#\#}\Sigma_{k=1 \text{ to } K} a_k + w [\Sigma_{k=1 \text{ to } K} a_k)(k-½)$.

Thus, when the graph of the line $(e\#\#(w,a_k),w)$intersects the level set for the appearance $(a_k)$, then the appearance is one for which the mean for the grouped data having the appearance $(a_k)$ can equal the sample mean. If an appearance level set is not intersected by the line $(e\#\#(w,a_k),w)$, then a discrepancy function illustrated in Equation 9:

$$|\text{mean of grouped data} - \text{sample mean}|, \quad (9)$$

can be evaluated at the vertices of the level set for the appearance $(a_k)$ and the (e, w) combination at the vertex having the smallest absolute deviation could be chosen, if for some other reason the appearance $(a_k)$ were wanted.

A grouped mean, sample mean discrepancy function, |mean of grouped data—sample mean|, is apparently piece-wise linear because of the absolute value function. However, even if the absolute value function is removed and the difference between mean-of-grouped-data and sample-mean is constant, the expression is valid only on the level set, $LS(a_k)$, for an appearance $(a_k)$. A common encounter with piecewise linear functions, $R^1 \to R^1$, is with polygonal functions, step functions and various piecewise linear functions possibly discontinuous at end points of some of the linear pieces. Using a polygonal partition of a domain, D or D*, and the mean for grouped data is a different linear function of (e, w) on each on of the interiors of the polygons of the partition. This can be called a "cell-wise linear function" on a partition of $R^2$, for piece-wise linear functions from $R^2$ to $R^1$.

Since a line segment of (e, w) values in the level set, $LS(a_k)$, of an appearance, $(a_k)$, may have the mean of the grouped data equal to the sample mean, it is possible to find on this line segment a point where the sample variance and variance of grouped data are equal.

For a fixed width, w, the location, $e^{\#\#\#\#}$ implied by Equation 10 makes the variance of the grouped data the same as or as close as possible to the variance of the actual data can be obtained from:

$$(e^{\#\#\#\#}-½w-\text{sample-mean})^2 = [SS_x - \Sigma_{k=1 \text{ to } K} a_k(2kw+k^2w^2)]/n \quad (10)$$

wherein $SS_x$ is a sum of squared deviations for the sample. If the right hand side is negative, then it is not possible to exactly achieve the sample variance for the appearance $(a_k)$, but this discrepancy may be minimized by a further analysis of Equation (10).

The sample variance of $x_i$ is equated to the variance (using the (n−1) divisor) of the data grouped by $[e^{\#\#\#\#}+(k-1)w, e^{\#\#\#\#}+kw)$, using the sample mean for the deviations from each interval midpoint, since by construction, since the grouped data and sample means were made equal. Then $e^{\#\#\#\#}$ is solved for via the expression $(e^{\#\#\#\#}-½w-\text{sample-mean})^2$.

For fixed w, to approximate higher moments, to minimize a convex combination of mean and variance distortion, etc., LaGrange Multipliers, or possibly one variable calculus may suffice. Note that as interval width becomes smaller, possibly all sample moments are approximated more closely by the grouped data, since the midpoints of data intervals for grouped data may be made arbitrarily close to the sample values.

The existence of samples having prescribed appearances and sets of appearances. The possibility of a given appearance for a given sample can be determined by solving an associated linear program. A described above both the appearance (1, 2,3,4) and its reversal, (4,3,2,1), are not possible for any sample. For any prescribed set of appearances, the associated set of linear inequalities may be used. If the inequalities are feasible, then there exists a sample having the prescribed set of appearances.

A "multidimensional histogram" is a partition of equal area cells, that may be rectangular, may be half open, etc., together with the counts of the points of a multidimensional data sample in each cell. For example, half open cells in $R^2$ are of the form [a,b)×[c,d) in the (x,y) plane; and would have equal areas if the widths, (b−a), (d−c) were the same for all cells of such a partition.

The one dimensional histogram analysis described above for Methods 20 and 66 is also used to discover possible multidimensional histogram appearances. Due to the rapid growth of a number of possibilities as the dimension increases, only two dimensions are used herein as examples. The generalization to more than two dimensions is clear to those skilled in the art.

As an example, consider multidimensional histogram appearances for cells having boundaries that are parallel to data space axes. A set of half open cells for counting $(x,y)$ points for a two dimensional histogram can be defined as is illustrated in Equation (11):

$$\text{Cell}_{p,q} = \{(x,y) | e_x + (p-1)w_x \leq x < e_x + pw_x \ \& \ e_y + (q-1)w_y \leq y < e_y + qw_y\} \quad (11)$$

for locations $e_x$ & $e_y$ for widths $w_x$ & $w_y$, where $(x,y)_i \in \text{Cell}_{p,q}$ means that $x_i$ & $y_i$ satisfy the inequalities above in Equation 11.

A two dimensional histogram appearance is the array of histogram counts, $a_{p,q}$ in the half open p,q cells such that for p=1, there is a q* such that $a_{1,q*} \geq 1$; for p=pMax, there is a q such that $a_{pMax,q} \geq 1$; for q=1, there is a p* such that $a_{p*,1} \geq 1$, for q=qMax, there is a p such that $a_{p,qMax} \geq 1$. From definitions, p*, p**, q*, q** always exist when the histogram appearances are defined.

This definition generalizes the one dimensional definition of a histogram appearance. Recall that a histogram appearance, $a_p$ in one dimension requires $a_1 \geq 1$ & $a_{last} \geq 1$. (For a three dimensional histogram, $a_{p,q,r}$ such that there are a p*, q* st. $a_{p*,q*,1} \geq 1$, etc. That is, to achieve a unique representative appearance for all the translations of an appearance, the histogram appearance is boxed in between $(p,q,r)=(1,1,1)$ and $p_{Max}, q_{Max}, r_{Max}$).

The possible appearances of a two dimensional histogram are determined by the possible one dimensional appearances of the sample values in each dimension considered separately. Note that $(x,y)$ is counted in the $(p,q)$ cell if and only if each value is in its respective one dimensional interval.

An illustrative example is very simple since the number of possibilities in many dimensions grows rapidly. Consider the following set of three two-dimensional, (x,y), points: {(1, 2), (2,5), (5,1)}. The x values: 1, 2,5 and the y values: 1, 2, 5 are identical, so the sets of possible histograms in each dimension are identical.

For the values {1, 2,5}, the possible appearances of length 3 or less are: (3), (1, 2), (2,1), (1,1,1) and (2,0, 1). (Only (1,0,2) is impossible.) The histogram partitions are labeled for these five appearances as A, B, C, D, E. Any partition for these appearances may be used independently for the x axis and for the y axis This leads to 25 possible 2 dimensional histogram appearances for the three points {(1, 2), (2,5), (5,1)}. However, if the intervals are required to be identical, then there are only five two dimensional histogram appearances.

Cells with boundaries that are not parallel to data spaces axes are also within the scope of the invention. Such cells are considered because it is plausible that such histograms are meaningful and useful. Such partitions of a plane can include rotated axes, diamond shaped cells; hexagonal cells, equilateral triangular cells, etc. Geographical and environmental applications may have use for such representations.

Return to the data sample {(1, 2), (2,5), (5,1)}, suppose it is necessary to determine all possible histograms for rotated cells and for equilateral triangular cells. For the usual rectangular cells rotated 45 degrees, use a same location parameter, e, and interval width, w, in each rotated dimension. The level curve axes are given by functions illustrated in Equation 12.

$$f_1(x,y) = x + y - (e + kw) = 0$$

$$f_2(x,y) = x - y - (e + kw) = 0 \quad (12)$$

For equilateral triangles with one side parallel to the x axis then the level curve axes are given by functions illustrated in Equation 13:

$$f_1(x,y) = y - (e+kw) = 0 \text{ (The level curves parallel to the x-axis).}$$

$$f_2(x,y) = (\sqrt{3})x - y - (e+kw) = 0$$

$$f_3(x,y) = (\sqrt{3})x + y - (e+kw) = 0. \quad (13)$$

To proceed, the "(e+kw)" term is not used. All that is necessary is to transform the data points and study the transformed values as described above. Table 8 illustrates rotated axis's $u = f_1(x, y)$ and $v = f_2(x, y)$.

TABLE 8

| (x, y) | x + y | x − y | "(u, v)" |
|---|---|---|---|
| (1, 2) | 3 | −1 | (3, −1) |
| (2, 5) | 7 | −3 | (7, −3) |
| (5, 1) | 6 | 4 | (6, 4) |

The intervals with these rotated axes may be the same width, as suggested at first, or different, using notation to distinguish the several widths and independent location parameters. Transformed or untransformed data may be analyzed leading to the marginal histogram appearances and the two dimensional histogram appearances.

Finally the axes and data may be transformed back to the original data space For equilateral triangles $u = f_1(x, y)$, $v = f_2(x, y)$ and $w = f_3(x, y)$ as is illustrated in Table 9.

TABLE 9

| (x, y) | y | $(\sqrt{3})x - y$ | $(\sqrt{3})x + y$ | "(u, v, w)" |
|---|---|---|---|---|
| (1, 2) | 2 | −.27 | 3.73 | (2, −.27, 3.73) |
| (2, 5) | 5 | −1.54 | 8.46 | (5, −1.54, 8.46) |
| (5, 1) | 1 | 7.66 | 9.66 | (1, 7.66, 9.66) |

Since equilateral triangular cells are desired, equal length intervals are used. To satisfy this requirement, all of the u, v, w values are combined to obtain the width and location value combinations leading to different appearances for the combined values. These values are sorted with the data versus the three marginal appearances. Note that even though a two dimensional graphic is used, triples of marginal appearances are created. With equilateral triangles, the cells are distinguished by three indices, "p, q, r," say, or possibly "$k_1, k_2, k_3$" for the intervals and cell as is illustrated in Table 10.

TABLE 10

$[e_1 + (k_1 - 1) w_1, e_1 + k_1 w_1) x$
$[e_2 + (k_2 - 1) w_2, e_2 + k_2 w_2) x$
$[e_3 + (k_3 - 1) w_3, e_3 + k_3 w_3) x$
or
$[e_1 + (k_1 - 1) w, e_1 + k_1 w) x$
$[e_2 + (k_2 - 1) w, e_2 + k_2 w) x$
$[e_3 + (k_3 - 1) w, e_3 + k_3 w) x$
or
$[e + (k_1 - 1) w, e + k_1 w) x$
$[e + (k_2 - 1) w, e + k_2 w) x$
$[e + (k_3 - 1) w, e + k_3 w) x$

For example, if $a_{6,3,7}=5$ then there are five (x,y) values such that $e_1+(k_1-1)w_1 \leq f_1(x,y)<e_1+k_1 w_1$; $e_2+(k_2-1)w_2 \leq f_2(x,y)<e_2+k_2 w_2$; $e_3+(k_3-1)w_3 \leq f_3(x,y)<e_3+k_3 w_3$. For $k_1$, $k_2$, $k_3$, respectively equal to 6, 3,7. That is, $e_1+5w_1 \leq f_1(x,y)<e_1+6w_1$; $e_2+2w_2 \leq f_2(x,y)<e_2+3w_2$; $e_3+6w_3 \leq f_3(x,y)<e_3+7w_3$. If $e=e_1=e_2=e_3$ and $w=w_1=w_2=w_3$, then $e+5w \leq f_1(x,y)<e+6w$; $e+2w \leq f_2(x,y)<e+3w$; and $e+6w \leq f_3(x,y)<e+7w$.

The methods described herein can be applied to generalize quantile plots, obtaining a similar variety of quantile appearances.

The methods and system described herein include listing all possible histogram appearances for a sample using constant width intervals and for multidimensional appearances with data cell boundaries that are parallel as well as not parallel to data space axes, for the location parameters and widths the same for each dimension, independent for each dimension, or related in any non-independent way.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A computer implemented method of determining all possible histogram appearances in a data sample, comprising:
    processing a data sample collected for a pre-determined application to identify one or more histogram appearance level sets, wherein the data sample includes a one-dimensional data sample or a multi-dimensional data sample, and
    wherein the pre-determined application includes an engineering finite element analysis application, geographical analysis application, environmental analysis application or granhical entity display application;
    analyzing the identified one or more histogram appearance level sets to determine a set of possible histogram data intervals for a plurality of points in the identified histogram appearance level sets;
    presenting a set of all possible histogram appearances for analysis on a graphical user interface using the determined set of possible histogram data intervals, wherein the analysis includes simultaneous analysis of histogram appearances of two or more one-dimensional data samples or analysis of histogram appearances of a multidimensional data sample; and
    determining a preferred set of histograms from a set of preferred histogram appearances selected from the presented set of all possible histogram appearances for the data sample, wherein the preferred set of histograms are displayed on a graphical user interface as multi-color graphical entities, wherein the determined preferred set of histograms are dependent on the data sample collected for the pre-determined application and wherein each unique data sample collected produces a unique set of preferred histogram appearances.

2. The method of claim 1 further comprising a computer readable medium having stored therein instructions for causing one or more processors to execute the steps of the method.

3. The method of claim 1 wherein a histogram appearance includes a list, $a_k$, of k-counts of sample points corresponding to a list of histogram intervals, wherein first and last counts, $a_f$, $a_{last}$, are positive.

4. The method of claim 1 wherein a histogram appearance level sets includes a set of points for which a function has a constant value or constant list of values.

5. The method of claim 1 wherein the processing step includes identifying all possible histogram appearances for the data sample for interval widths greater than or equal to any positive value, for histograms with equal width intervals.

6. The method of claim 1 wherein the processing step includes identifying all possible histogram appearances having at most K intervals between and including a first and a last that have sample points, for histograms with equal width intervals.

7. The method of claim 1 wherein the processing step includes identifying all possible histogram appearances using different enumerations of intervals and counts including a number of leading or trailing counts of zero as well as equal or different numbers of both leading and trailing counts of zero.

8. The method of claim 1 wherein the processing step includes identifying all possible histogram appearances having a plurality of different or equal, location parameter values, interval widths, or numbers of intervals between and including a first and last intervals having sample points.

9. The method of claim 1 wherein the processing step includes identifying all possible histogram appearances for the data sample by identifying all possible equal interval width and location combinations that lead to a given histogram appearance using polygonal subsets in a two dimensional plane of real numbers, wherein one dimension corresponds to a location parameter and another dimension corresponds to an interval width parameter.

10. The method of claim 1 wherein the processing step includes identifying all possible histogram appearances for the data sample by identifying vertices of one or more polygons formed by an intersection of a set of straight lines in a plane providing a set of subsets of points of intersection that are associated with a polygon.

11. The method of claim 1 wherein the processing step includes identifying all possible histogram appearances for the data sample by identifying vertices of regions formed by an intersection of a set of level curves in a plane by identifying a set of subsets of points of intersection that are associated with each polygon level set formed.

12. The method of claim 1 wherein the processing step includes identifying all one dimensional histogram appearances using constant width intervals, wherein the constant width intervals are greater than or equal to a pre-determined positive minimum width.

13. The method of claim 1 wherein the processing step includes idantifying all histogram multidimensional appearances with data cell boundaries that are parallel as well as not parallel to data space axes, and wherein the multidimensional widths may satisfy separate pre-determined positive minimum widths for each dimension or a common positive minimum width and wherein the multidimensional interval widths may all be the same or may be independent of one another.

14. The method of claim 1 wherein the analyzing step includes analyzing histogram sequence level sets, wherein the histogram sequence level sets are the one or more identified histogram appearance level sets analyzed with a pre-determined set of constraints, wherein the one or more identified appearance level sets are described by a minimal set of location and width parameters in a transformed sample space, such that each histogram appearance has only one histogram appearance level set in the transformed sample space.

15. The method of claim 1 wherein the presenting step includes presenting the determined set of possible histograms appearances or a histogram created from the determined set of possible histogram appearances on a graphical user interface as multi-colored graphs.

16. The method of claim 1 wherein the presenting step includes presenting simultaneously histogram appearances of two or data samples by visually comparing two or more data samples with a pair or with a set of histogram appearances, one for each sample.

17. The method of claim 1 wherein the presenting step includes presenting configurations and forms of sets of possible simultaneous histogram appearances for a plurality of data samples subject to a requirement that each set of simultaneous histogram appearances correspond to a set of histograms using intervals that are identical.

18. The method of claim 1 wherein the presenting step includes presenting configurations and forms of sets of possible simultaneous histogram appearances for a plurality of data samples subject to a requirement that each set of simultaneous histogram appearances correspond to a set of histograms using intervals that are not identical.

19. The method of claim 1 further comprising:
presenting the determined plurality of histogram appearances as one or more multi-colored graphical entities, including multi-colored bar graphs, multi-colored line graphs or multi-colored pie-chart graphs on the graphical user interface.

20. The method of claim 1 further comprising:
printing reports based on analyzing and sorting of the set of all possible histogram appearances presented on the graphical user interface.

21. A computer implemented method of determining all possible histogram appearances in a data sample, comprising:
(a) applying an affine transformation to an original value data sample of a data sample collected for a pre-determined application to transform all values in the data sample to fit within a pre-determined interval thereby creating a transformed data value set, wherein the pre-determined application includes an engineering finite element analysis application, geographical analysis application, environmental analysis application or graphical entity display application;
(b) determining a plurality of vertices for a plurality of polygons associated with or dependent upon boundaries of the transformed data value;
(c) selecting a point (Z) from the transformed data value set;
(d) selecting a slope (Z) from a set of K-slopes;
(e) calculating a line (Z) through the selected point (Z) with the selected slope (Z);
(f) determining whether the calculated line intersects any of the plurality of polygons using the determined plurality of vertices, and if so,
(g) recording a plurality of vertices for an intersection of the calculated line with subsets of vertices defining one or more new polygons obtained by dividing a polygon intersected by the calculated line into a plurality of portions;
(h) determining whether there is a next slope (Z+1) from the set of K-slopes, and if so,
(i) calculating a line (Z+1) through the selected point (Z) and with the new slope (Z+1),
(j) repeating steps (f)-(i) until there is not a next slope (Z+1) for the set of K-slopes;
(k) determining if there is a next point (Z+1); and if so,
(l) calculating a line (Z+2) with the next point (Z+1) and the next slope (Z+1);
(m) repeating steps (f)-(l) until there is not a next point (Z+1) in the transformed data value set;
(n) determining a transformed point from each of the plurality polygon levels set for which vertices have been recorded;
(o) determining a plurality of histogram appearances corresponding to histogram level set using the determined transformed point;
(p) presenting the determined plurality of histogram appearances on a graphical user interface for analysis, wherein the analysis includes simultaneous analysis of the plurality of histogram appearances of two or more one-dimensional data samples or analysis of the plurality of histogram appearances of a multidimensional data sample;
(q) determining a preferred set of histograms from a set of preferred histogram appearances selected from the presented determined plurality of histogram appearances for the original value data sample, wherein the determined preferred set of histograms are dependent on the original value data sample and wherein each unique original value data sample produces a unique set of preferred histogram appearances; and
(r) presenting one or more multi-colored histograms from the determined preferred set of histograms created from the determined preferred set of histogram appearances on the graphical user interface as one or more multi-colored-graphical entities.

22. The method of claim 21 further comprising a computer readable medium having stored therein instructions for causing one or more processors to execute the steps of the method.

23. The method of claim 21 wherein the step of determining a plurality of vertices includes determining at least five vertices $(0, 1)$, $(1-\delta_1, \delta_1)$, $(1, \delta_1)$, $(1, 1+\delta_2)$, $(0, 1+\delta_2)$ of a polygon from the transformed data value set wherein $\delta_1$ includes a first increment parameter in a pre-determined interval, and $\delta_2$ includes a second increment parameter in the pre-determined interval, and wherein the pre-determined interval is [1, 2].

24. The method of claim 21 wherein a polygon in the plurality of polygons includes a polygon D*, wherein, $$D^* = \{(e^*, w^*) | 0 \leq e^* \leq 1 < e^* + w^*, \delta_1 \leq w^* \leq 1+\delta_2\},$$

wherein e* is a location parameter in the transformed data value set and w* is width parameter in the transformed data value set and wherein $\delta_1$, is a first increment parameter and $67_2$ is a second increment parameter in the pre-determined interval, and wherein the pre-determined interval is [1, 2].

25. The method of claim 21 wherein the set of K-slopes includes a set comprising:

$$\{-1, -\frac{1}{2}, -\frac{1}{3}, \ldots, -1/k, \ldots, -1/K\},$$

wherein k is a $k^{th}$ count term in the transformed data value set and K is a maximum number of intervals between and including a first interval and a last interval having data values in them.

26. The method of claim 21 wherein the calculated line includes a line calculated with:

$$e^* + kw^* = x_{(i)*},$$

wherein $e^*$ is location parameter in the transformed data value set, $w^*$ a width parameter in the transformed data value set and $w^*$, k is a $k^{th}$ count term in the transformed data value set and $x_{(i)*}$ is an $i^{th}$ data point from the transformed data value set.

27. The method of claim 21 wherein the plurality of histogram appearances each include a list, $a_k$, of k-counts of data points from the transformed data value set corresponding to a list of histogram intervals, wherein first and last counts, $a_1$, $a_{last}$, are positive.

28. A histogram creating system, comprising in combination:
a first software module stored on a computer readable medium including instructions for processing a data sample connected for a pre-determined application to produce a transformed data sample defining an entire set of ($e^*$, $w^*$), wherein $e^*$ is location parameter in the transformed data sample and $w^*$ is width parameter in the transformed data sample, that corresponds to a bet of all possible histograms for a transformed data sample, wherein there is a one-to-one correspondence of the ($e^*$, $w^*$) points to set of all possible histograms and wherein a set of all ($e^*$, $w^*$) are partitioned into histogram appearance level sets, so that the set of all possible histograms are grouped together and presented according to histogram appearances,
wherein the pre-determined application includes an engineering finite element analysis application, geographical analysis application, environmental analysis application or graphical entity display application;
a second software module stored on a computer readable medium including instructions for displaying the set of all possible histograms appearances on a graphical user interface as a graphical entity for analysis and for printing reports based on analyzing and sorting of all possible histogram appearances, wherein the analysis includes simultaneous analysis of histogram appearances of two or more one-dimensional data samples or analysis of histogram appearances of a multidimensional data sample; and
a third software module stored on a computer readable medium including instructions for determining a preferred set of histograms from a set of preferred histogram appearances selected from the presented set of all possible histogram appearances for the transformed data sample, wherein the preferred set of histograms are displayed on a graphical user interface as multi-color graphical entities, wherein the determined preferred set of histograms are dependent on transformed data sample and wherein each unique transformed data sample produces a unique set of preferred histogram appearances.

29. A computer implemented histogram creating system, comprising in combination:
a means for identifying a first set of all possible histogram appearances from a one dimensional data sample collected for a pre-determined application using one dimensional histogram appearances identified by determining all possible histogram appearances for a data sample using constant width intervals, wherein the pre-determined application includes an engineering finite element analysis application, geographical analysis application, environmental analysis application or graphical entity display application;
a means for identifying a second set of all possible histogram appearances from a multidimensional data sample collected for the pre-determined application using histogram multidimensional appearances identified with data cell boundaries that are parallel as well as not parallel to data space axes as well as multiple or identical interval locations widths in the multidimensional appearances and transformed multidimensional data sample; and
a means for displaying the identified first and second set of all possible histograms appearances on a graphical user interface as a graphical entity for analysis and for printing reports based on analyzing and sorting of the identified first and second set of all possible histogram appearances displayed on the graphical user interface, wherein the analysis includes simultaneous analysis of histogram appearances of two or more one dimensional data samples or analysis of histogram appearances of a multidimensional data sample; and
means for determining a preferred set of histograms from a set of preferred histogram appearances selected from the identified first and second set of all possible histogram appearances for the one dimensional and multi-dimensional data samples, wherein the preferred set of histograms are displayed on a graphical user interface as multi-color graphical entities, wherein the determined preferred set of histograms are dependent on the one dimensional data sample and multi-dimensional data sample and wherein each unique one dimensional data sample and unique multi-dimensional data sample produces a unique set of preferred histogram appearances.

30. A computer implemented histogram creating system, comprising in combination:
a means for determining all possible histogram appearances in a data sample collected for a pre-determined application wherein the data sample includes a one-dimensional data sample or a multi-dimensional data sample, wherein the pre-determined application includes an engineering finite element analysis application, geographical analysis application, environmental analysis application or graphical entity display application;
a means for displaying the determined set of all possible histograms appearances on a graphical user interface as a graphical entity for analysis and for printing reports based on analyzing and sorting of the set of possible histogram appearances, wherein the analysis includes simultaneous analysis of histogram appearances of two or more one-dimensional data samples or analysis of histogram appearances of a multidimensional data sample; and
means for determining a preferred set of histograms from a set of preferred histogram appearances selected from the presented set of all possible histogram appearances for the data sample, wherein the preferred set of histograms are displayed on a graphical user interface as multi-color graphical entities, wherein the determined preferred set of histograms are dependent on the data sample collected for the pre-determined application and wherein each unique data sample produces a unique set of preferred histogram appearances.

31. The histogram creating system of claim 30, wherein the means determining all possible histogram appearances in a data sample includes:

a means for processing a data sample is to identify one or more histogram appearance level sets, for analyzing the identified one or more histogram appearance level sets to determine a set of possible histogram data intervals for a plurality of points in the identified histogram appearance level sets, and for presenting a set of all possible histogram appearances on a graphical user interface using the determined set of possible histogram data intervals.

32. The histogram creating system of claim 30, wherein the means determining all possible histogram appearances in a data sample includes:

a means for (a) applying an affine transformation to an original value data sample of a data sample to transform all values in the data sample to fit within a pre-determined interval thereby creating a transformed data value set; (b) determining a plurality of vertices for a plurality of polygons associated with or dependent upon boundaries of the transformed data value; (c) selecting a point (Z) from the transformed data value set; (d) selecting a slope (Z) from a set of K-slopes; (e) calculating a line (Z) through the selected point (Z) with the selected slope (Z); (f) determining whether the calculated line intersects any of the plurality of polygons using the determined plurality of vertices, and if so, (g) recording a plurality of vertices for an intersection of the calculated line with subsets of vertices defining one or more new polygons obtained by dividing a polygon intersected by the calculated line into a plurality of portions; (h) determining whether there is a next slope (Z+1) from the set of K-slopes, and if so, (i) calculating a line (Z+1) through the selected point (Z) and with the new slope (Z+1), (j) repeating steps (f)-(i) until there is not a next slope (Z+1) for the set of K-slopes; (k) determining if there is a next point (Z+1); and if so, (l) calculating a line (Z+2) with the next point (Z+1) and the next slope (Z+1); (m) repeating steps (f)-(l) until there is not a next point (Z+1) in the transformed data value set; (n) determining a transformed point from each of the plurality polygon levels set for which vertices have been recorded; (o) determining a plurality of histogram appearances corresponding to histogram level set using the determined transformed point; and (p) presenting the determined plurality of histogram appearances on a graphical user interface.

\* \* \* \* \*